(12) United States Patent
Reinhart

(10) Patent No.: US 10,591,166 B2
(45) Date of Patent: Mar. 17, 2020

(54) AUTOMATED TEMPERATURE CONTROL METHOD FOR A SOLID-FUELED COOKER

(71) Applicant: IOT CONTROLS LLC, Clearwater, FL (US)

(72) Inventor: Eric D. Reinhart, West Bloomfield, MI (US)

(73) Assignee: IOT CONTROLS LLC, Clearwater, FL (US)

( * ) Notice: Subject to any disclaimer, the term of this patent is extended or adjusted under 35 U.S.C. 154(b) by 0 days.

(21) Appl. No.: 15/223,320

(22) Filed: Jul. 29, 2016

(65) Prior Publication Data

US 2016/0334106 A1 Nov. 17, 2016

Related U.S. Application Data

(62) Division of application No. 13/231,036, filed on Sep. 13, 2011, now Pat. No. 9,427,107.

(51) Int. Cl.
| | |
|---|---|
| *A23L 5/10* | (2016.01) |
| *F24B 1/187* | (2006.01) |
| *F24C 15/32* | (2006.01) |
| *F24C 15/20* | (2006.01) |
| *F24B 1/189* | (2006.01) |
| *F24C 15/00* | (2006.01) |
| *A47J 37/07* | (2006.01) |
| *A47J 37/06* | (2006.01) |

(52) U.S. Cl.
CPC .............. *F24B 1/187* (2013.01); *A23L 5/17* (2016.08); *A47J 37/0664* (2013.01); *A47J 37/0786* (2013.01); *F24B 1/1895* (2013.01); *F24C 15/001* (2013.01); *F24C 15/2007* (2013.01); *F24C 15/32* (2013.01); *A47J 37/0754* (2013.01); *A47J 2202/00* (2013.01)

(58) Field of Classification Search
CPC .... A21B 1/04; A21B 1/40; A21B 1/52; A23L 5/10; A23L 5/17; A47J 33/00; A47J 37/07–2037/0795; A47J 37/0664; A47J 37/0754; A47J 2202/00; A47J 37/0786; F24B 1/187; F24B 1/189–1/1902; F24B 3/00; F24B 5/00; F23L 13/00–13/10; F23N 3/00–3/087; F24C 15/001–15/002; F24C 15/20–15/2092; F24C 15/32
USPC ............ 426/231–233, 523; 99/325–338, 450
See application file for complete search history.

(56) References Cited

U.S. PATENT DOCUMENTS

| 655,761 | A | * | 8/1900 | Culver |
|---|---|---|---|---|
| 1,993,607 | A | * | 3/1935 | Kalgren ............... A47J 37/047 126/41 B |

(Continued)

OTHER PUBLICATIONS

Press, Barry and Press, Marcia, Geek House: 10 Hardware Pakaging Projects for Around Home, "Chapter 8, Automated BBQ Temperature Control", Wiley Publishing, Inc., Indianapolis, 2005, pp. 159-183.

*Primary Examiner* — Drew E Becker
(74) *Attorney, Agent, or Firm* — Kurt L. VanVoorhies

(57) ABSTRACT

An actuated vent valve external of, and in series with a vent port of, a solid-fueled cooker is automatically controlled by controlling a flow of air into a combustion region of the solid-fueled cooker so as to substantially regulate a first temperature within a cooking region of a solid-fueled cooker to a user-defined temperature level responsive to a first temperature signal measured within the cooking region of the solid-fueled cooker.

16 Claims, 20 Drawing Sheets

(56) References Cited

U.S. PATENT DOCUMENTS

| | | | | |
|---|---|---|---|---|
| 2,950,669 A * | 8/1960 | Terry | .................. | A47J 37/0754 126/25 B |
| 3,041,959 A * | 7/1962 | Oyler | ...................... | A47J 37/06 126/273 R |
| 3,228,605 A | 1/1966 | Diermayer et al. | | |
| 3,266,478 A * | 8/1966 | Booth | .................. | A47J 37/0754 126/144 |
| 3,327,617 A * | 6/1967 | Harlett | ..................... | A47J 37/07 99/340 |
| 3,491,678 A * | 1/1970 | Oyler | ...................... | A23B 4/052 99/357 |
| 3,500,812 A * | 3/1970 | Korngold | ............ | A47J 37/0704 126/25 R |
| 3,529,556 A * | 9/1970 | Barnes | .................. | A47J 37/0754 126/25 A |
| 3,561,348 A * | 2/1971 | Weir, Sr. | .................. | A47J 37/06 126/25 R |
| 3,611,915 A * | 10/1971 | Glaser | .................. | A47J 37/0786 126/25 R |
| 3,691,931 A * | 9/1972 | Persson | ................. | B08B 15/002 126/299 D |
| 3,951,335 A | 4/1976 | Kemp | | |
| 4,043,312 A * | 8/1977 | Kern | ................. | A47J 37/0713 126/41 R |
| 4,044,750 A * | 8/1977 | Zeigler | ................. | F04D 29/526 126/25 B |
| 4,114,805 A | 9/1978 | Humphreys | | |
| 4,180,051 A | 12/1979 | Maier et al. | | |
| 4,231,513 A | 11/1980 | Vance et al. | | |
| 4,245,778 A | 1/1981 | Diermayer | | |
| 4,272,013 A | 6/1981 | Diermayer et al. | | |
| 4,347,832 A * | 9/1982 | Myers | ...................... | F23L 3/00 110/147 |
| 4,430,985 A * | 2/1984 | Huneycutt | .............. | F24B 1/202 126/15 R |
| 4,434,781 A | 3/1984 | Koziol | | |
| 4,608,961 A * | 9/1986 | Lanham, Jr. | .............. | A21B 1/24 126/21 A |
| 4,934,260 A * | 6/1990 | Blevins | .................. | A23B 4/052 126/21 A |
| 5,154,159 A * | 10/1992 | Knafelc | .............. | A47J 37/0704 126/154 |
| 5,752,497 A * | 5/1998 | Combs | ................ | A47J 37/0704 126/25 A |
| 6,223,737 B1 | 5/2001 | Buckner | | |
| 6,708,691 B1 | 3/2004 | Hayek | | |
| 7,263,990 B1 | 9/2007 | Lenhart | | |
| 7,516,692 B2 * | 4/2009 | Pirkle | ...................... | A47J 27/62 99/333 |
| 7,699,237 B2 | 4/2010 | Berkenkoetter et al. | | |
| 7,798,139 B2 | 9/2010 | Gagas et al. | | |
| 7,900,624 B2 * | 3/2011 | DeMars | .............. | A47J 37/0704 126/242 |
| 8,113,823 B2 | 2/2012 | Guzorek | | |
| 8,371,286 B2 * | 2/2013 | McCown | ................ | F23L 11/00 126/25 R |
| 8,426,777 B2 * | 4/2013 | Elston, III | .............. | F24C 7/087 219/391 |
| 8,636,567 B2 | 1/2014 | Fitzgerald et al. | | |
| 8,800,542 B1 * | 8/2014 | Kennington | .......... | F24B 15/005 126/15 A |
| 8,931,400 B1 * | 1/2015 | Allen | ....................... | H04Q 9/00 340/870.09 |
| 9,427,107 B2 * | 8/2016 | Reinhart | ............. | A47J 37/0786 |
| 2002/0189462 A1 | 12/2002 | Guess | | |
| 2003/0015188 A1 * | 1/2003 | Harbin | ................ | A47J 37/0754 126/25 R |
| 2004/0031398 A1 * | 2/2004 | Jiang | ......................... | A23L 3/40 99/483 |
| 2005/0034716 A1 * | 2/2005 | Harbin | .................... | A47J 37/01 126/25 R |
| 2005/0247304 A1 * | 11/2005 | Weiss | ..................... | F23L 11/005 126/504 |
| 2010/0132692 A1 * | 6/2010 | Shaffer | ................ | A47J 37/0713 126/39 E |
| 2013/0206015 A1 * | 8/2013 | Jacoby | ..................... | A47J 37/07 99/330 |
| 2014/0137853 A1 * | 5/2014 | Murray | ................. | F24C 15/322 126/21 A |

* cited by examiner

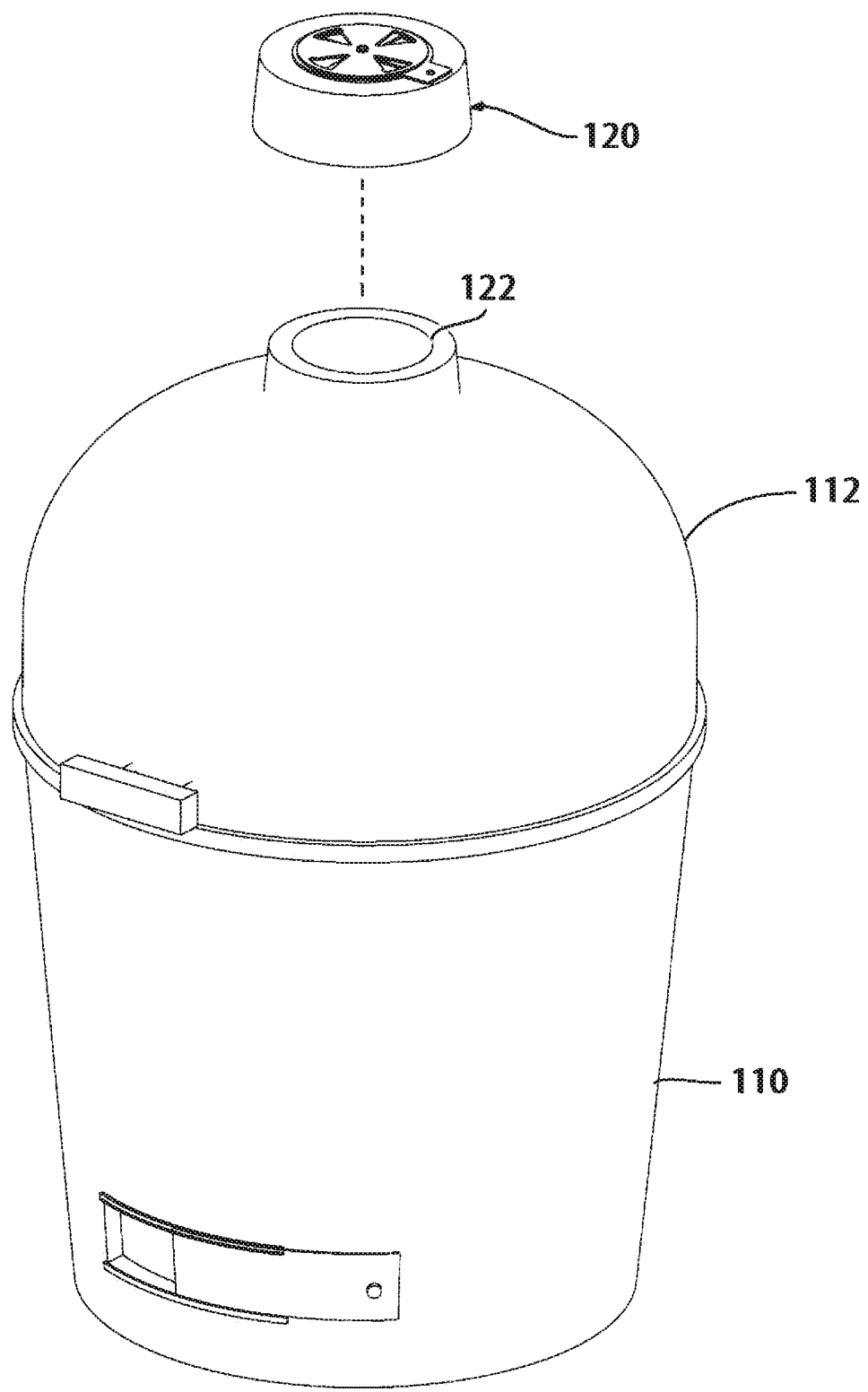
FIG. 1B    PRIOR-ART

AUTOMATED TEMPERATURE CONTROL METHOD FOR A SOLID-FUELED COOKER

CROSS-REFERENCE TO RELATED APPLICATIONS

The instant application is a division of U.S. application Ser. No. 13/231,036 filed on 13 Sep. 2011, now U.S. Pat. No. 9,427,107, which is incorporated herein by reference in its entirety.

FIELD

This application relates to ovens, charcoal-burning barbecue grills, and the like, and more specifically, to temperature control of such ovens, grills and like devices.

BACKGROUND

Temperature control of solid-fueled grills is generally effected through manual throttling of a vent damper located in series with at least one of a combustion chamber inlet air vent, or combustion chamber exhaust vent. For example, during operation of a solid-fueled grill, the temperature of the grill may be reduced by at least partially closing one or more of the combustion chamber inlet or exhaust vent dampers. This action reduces the flow of fresh air for combustion to the fuel, thus resulting in a reduction of the rate of heat energy released by the combustion process. Conversely, the operating temperature of a solid-fueled grill may be increased during operation by at least partially opening one or more of the combustion chamber inlet or exhaust vent dampers.

Many charcoal or wood burning grill operators cook foods for long durations; in many cases twelve or more hours at low temperatures. It is problematic for the grill operator to have to frequently inspect the grill operating temperature and adjust the combustion chamber vent damper settings to maintain a target temperature for such long duration cooking cycles. Furthermore, this type of manual temperature control does not result in consistent and accurate operating temperatures, but rather variable and inconsistent operating temperatures.

Numerous factors such as variable fuel characteristics, ambient weather (temperature, humidity, precipitation, etc.) and drippings from the food item falling into the combustion chamber affect the temperature response of the grill to a given damper setting. Therefore, it is not possible to determine a correct damper setting for a given target cooking temperature prior to beginning a cooking cycle. Furthermore, during multi-hour cooking operations, ambient conditions and fuel characteristics are likely to vary, resulting in a continuously changing "correct" damper setting required to maintain a given target temperature in the cooking region.

Several apparatuses and methods for temperature control of solid-fueled grills appear in the prior art that employ electrically-driven blowers controlled by digital microcontrollers such that the blower controls the flow rate of fresh air through the combustion chamber, and is intermittently cycled on/off at varying duty cycles in accordance with a user-specified target temperature. U.S. Pat. Nos. 7,263,990 and 7,516,692, and US Patent Application Publication 2003/0015188 A1 are examples of such devices with electrically-driven blowers.

A major functional problem with these and any forced air temperature control is that blower systems are only effective at increasing airflow through a combustion chamber, and cannot provide significant resistance to naturally occurring airflow due to the "chimney effect" when powered off.

The chimney effect is naturally occurring flow of air established as hot air exits the combustion chamber through an exhaust vent that is positioned at a higher elevation than an inlet vent. The natural force that drives the hot exhaust from the combustion chamber is the action of buoyancy. Continuity results in fresh air being drawn into the inlet vent to replace a portion of the exiting exhaust gas. When a forced air temperature controller is deactivated, combustion airflow rate is established by the chimney effect, and the passage area of the blower flow path and/or the passage area of dampers in series with the combustion airflow path. Activation of a blower (as in the prior art mentioned above) can increase airflow, but it cannot reduce it.

Because of this chimney effect, forced air temperature control apparatuses are not well suited to cooking operations that require substantial changes in operating temperature during the cooking cycle. For example, a grill operator employing a forced air device might adjust combustion chamber vent dampers that are in series with the blower to yield a flow passage area small enough to require the blower to be energized to achieve the required airflow rate for proper operation. However, the operator must also determine that the chosen flow passage area is not so small that the blower is prevented from achieving the required airflow rate.

This characteristic of forced air control systems requires the operator to guess an appropriate damper setting prior to the cooking operation, and additionally requires the operator to monitor the progress of the cooking operation to ensure that the control device is achieving and maintaining the target temperature. Moreover, if the intended cooking cycle entails a variable temperature profile consisting of a period of operation at high temperature followed by or preceded by operation at a greatly reduced temperature, the operator may be obliged to reposition combustion chamber vent dampers in accordance with the changing requirements of the blower system.

An additional problem with forced air control systems is that they may not quickly recover from elevated combustion rates and temperature "flare ups" associated with the grill operator opening the lid of the grill to access the food, or from combustible drippings from food reaching the combustion chamber. Again, this is because they are only suited to increase airflow rates, not to resist them.

Yet another problem with these forced air control devices is that they require significant and continuous electrical current to operate, eliminating small battery packs or the like as a practical electrical source for extended duration operation, and requiring that a user have a permanent power source nearby (such as a wall outlet) or a large battery pack that will provide power for a sufficiently lengthy period.

Other attempts in the prior art to solve the problem include thermomechanically-actuated devices. U.S. Pat. No. 4,430,985, entitled "Thermostatically Controlled Charcoal Cooker" suggests the use of a thermo-mechanical system that actuates inlet and exit airflow valves to control fresh airflow rate through the combustion chamber, thus controlling fuel burn rate and internal temperature. However, this patent describes an open-loop proportional control system, which can only be accurate at the exact condition for which it was designed, and cannot adapt to varying airflow requirements for a given temperature when subjected to off-design conditions or disturbances. Essentially, this system could only perform with "ballpark" accuracy.

U.S. Pat. No. 4,434,781, entitled "Thermally efficient barbecue grill" details a positive feedback proportional control system. In this device, dampers open in direct proportion to heat generation. This arrangement is not practical for a solid fuel (charcoal) burning grill and could only be stable for a gas grill configuration, as the heat output would not increase with dampers opening without a commanded increase in gas fuel flow rate.

U.S. Pat. No. 6,223,737, entitled "Pellet fuel burning device" describes a grill that burns special wood or charcoal pellets, and controls operating temperature according to a user-specified target. Control is affected through the use of an electrically-driven auger that varies the rate of fuel delivery from a storage hopper to the combustion chamber. In addition, an electrically-driven blower is used to control airflow to the combustion chamber. This type of temperature control scheme suffers from all of the drawbacks of the above mentioned blower systems, and is also disadvantageous in that it requires many moving parts (subject to wear and tear), consumes a large amount of electricity, is complicated to operate, and requires specially-fabricated fuel pellets (as opposed to widely-available wood or charcoal pieces).

Accordingly, there persists a need for accurately controlling the cooking temperature for solid-fueled grills and ovens which overcomes all of the disadvantages of the prior art. There also persists a need for an apparatus for adjusting cooking temperature as required by the cooking process and for maintaining a desired temperature as the conditions in and around the grill or oven change. Furthermore, there exists a need for an apparatus that does not require a great deal of power to operate, and is easy to use and to manufacture.

SUMMARY OF THE DISCLOSURE

Accordingly, in light of the above, provided herein is an automated temperature control system comprising a digital feedback device that monitors and regulates the operating temperature of solid-fueled grills or ovens. Temperature regulation is affected via automatic actuation of a mechanical vent damper, which damper throttles the flow of fresh air through the combustion chamber of the grill in accordance with a user-specified target temperature. The control provided by the system disclosed herein yields accurate steady-state temperature control across a wide operating range, and eliminates the need for the operator to continuously monitor the grill temperature and/or to make frequent adjustments to the combustion chamber vent damper(s). At least some of the components of the system may be encased in a housing to protect them from exposure to harmful environments and/or weather conditions.

The system disclosed herein responds quickly to remedy the aforementioned combustion "flare ups" commonly encountered when cooking fatty meats at high temperatures over charcoal or wood. Furthermore, the system described herein consumes relatively small amounts of electricity, is simple to operate, and may be easily retrofitted to common solid-fueled grills or ovens already on the market.

This together with other aspects of the present disclosure, along with the various features of novelty that characterize the present disclosure, is pointed out with particularity in the claims annexed hereto and form a part of this present disclosure. For a better understanding of the present disclosure, its operating advantages, and the specific objects attained by its uses, reference should be made to the accompanying drawings and descriptive matter in which there are illustrated exemplary embodiments of the present disclosure.

DESCRIPTION OF DRAWINGS

The advantages and features of the present disclosure will become better understood with reference to the detailed description taken in conjunction with the accompanying drawings, wherein like elements are identified with like symbols, and in which:

FIG. 1B illustrates a prior-art, manually-operated original equipment exhaust vent damper of the typical grill.

DESCRIPTION OF DRAWING REFERENCE NUMERALS

Figure 1A:
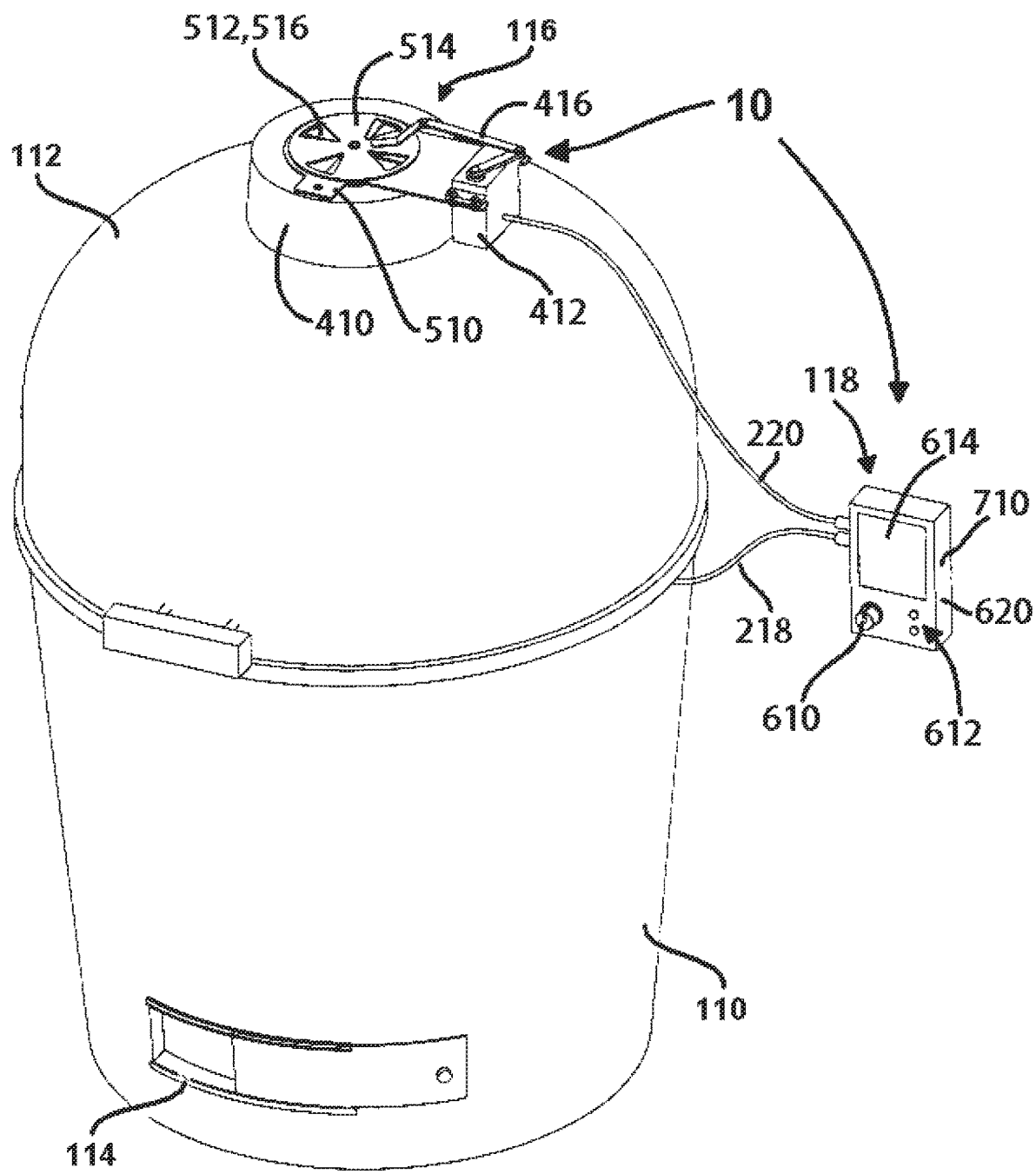
FIG. 1A depicts an automated temperature control system installed on a typical grill, in accordance with an exemplary embodiment of the present disclosure.

| | |
|---|---|
| 10 | automated temperature control system (first embodiment) |
| 10' | automated temperature control system (second embodiment) |
| 110 | grill body |
| 112 | grill lid |
| 114 | inlet damper |
| 116 | automated damper assembly |
| 118 | remote control module |
| 120 | factory damper assembly |
| 122 | grill exhaust vent |
| 210 | fuel grate |
| 212 | combustion region |
| 214 | food grate |
| 216 | cooking region |
| 218 | temperature probe leads |
| 220 | control lead |
| 310 | food temperature probe |
| 312 | operating temperature probe |
| 410 | base adapter |
| 412 | actuator |
| 414 | control arm |
| 416 | connecting rod |
| 510 | base plate |
| 512 | base plate port |
| 514 | valve plate |
| 516 | valve port |
| 518 | spacer bushing |
| 520 | valve plate fastener |
| 522 | valve plate control arm |
| 524 | pin fastener |
| 526 | semi-circular notches |
| 610 | rotary encoder |
| 612 | user interface buttons |
| 614 | visual display |
| 616 | temperature probe lead receptacle |
| 618 | controller lead receptacle |
| 620 | enclosure |
| 710 | auxiliary power receptacle |
| 712 | battery cover |
| 714 | battery compartment |
| 810 | primary digital microcontroller |
| 812 | voltage source |
| 814 | voltage regulator |
| 816 | operating temperature thermocouple amplifier |
| 818 | food temperature thermocouple amplifier |
| 1010 | wireless remote control module |
| 1012 | wireless automated damper assembly |
| 1105 | wireless local control module |
| 1110 | wireless local control module enclosure |
| 1112 | battery cover |
| 1114 | auxiliary power receptacle |
| 1116 | power button |
| 1212 | battery compartment |
| 1214 | temperature probe lead receptacle |
| 1310 | voltage source |
| 1312 | local wireless transceiver module |
| 1314 | voltage regulator |
| 1410 | secondary digital microcontroller |
| 1412 | remote wireless transceiver module |

DETAILED DESCRIPTION OF THE DISCLOSURE

The best mode for carrying out the disclosure is presented in terms of its preferred embodiment, herein depicted in the accompanying figures. The preferred embodiments described herein provide detail for illustrative purposes are subject to many variations. It is understood that various omissions and substitutions of equivalents are contemplated as circumstances may suggest or render expedient, but are intended to cover the application or implementation without departing from the spirit or scope of the present disclosure.

The terms "a" and "an" herein do not denote a limitation of quantity, but rather denote the presence of at least one of the referenced item.

As used herein, the term "grill" implies any cooking grill, smoker, oven, kiln, cooking apparatus, or heating apparatus that is heated through combustion of solid fuel, such as but not limited to charcoal or wood. Additionally, "grill" implies an apparatus comprising a combustion chamber having both inlet vents and exhaust vents, and an operating or cooking region to which heat is transferred from a combustion region through at least one of conduction, convection or radiation. The term "cooking region" is used throughout to denote a region in which operating temperature control is to be affected, and it will be apparent that ovens and similar heating devices or environments may be used in connection with the automated temperature control system 10 described herein for heating operations other than the cooking of food.

Figure 2A:
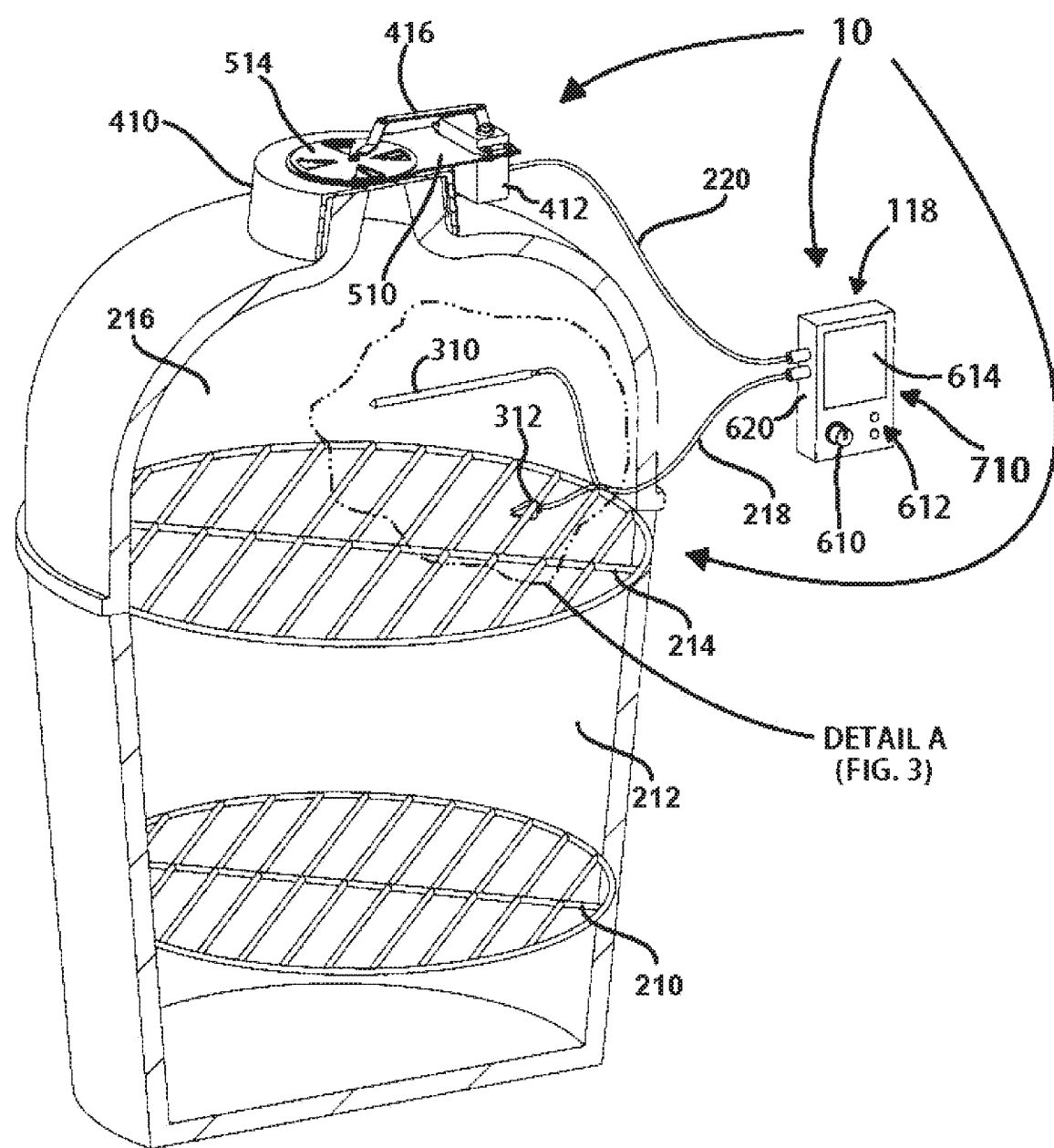
FIG. 2A is a perspective view of the installation described in FIG. 1A, in accordance with an exemplary embodiment of the present disclosure.

Referring now to FIGS. 1A and 2A, an exemplary first embodiment of an automated temperature control system 10 installed on a typical grill is shown. In this embodiment, the automated temperature control system 10 comprises an automated damper assembly 116 and a remote control module 118 which operate in conjunction with at least one operating temperature probe 312 (which probe will be described in connection with FIG. 3).

The grill configuration shown in FIGS. 1A and 2A comprises an ovoidal or cylindrical body 110, comprising a combustion region 212 in the bottom portion of the body 110, above which region is a cooking region 216. (It will be apparent that the shape of the body 110 shown in the figures is exemplary, and that the automated temperature control system 10 may be implemented with a grill configuration of any shape.) Cooking region 216 is in thermal communication with the combustion region 212 through a grate 214 (i.e. a perforated partition), or through a thermally-conductive solid partition (the latter, for example, as illustrated in FIGS. 2C and 2D), upon which grate 214 food may be placed. Cooking region 216 typically may be enclosed by a removable dome-shaped grill lid 112, which lid composes an upper portion of the grill. A fuel grate 210 supports solid fuel (that may combust in the grill and may be used in the cooking process), providing space below the fuel through which fresh air from an inlet damper 114 may pass. Smoke stack or grill exhaust vent 122 is disposed at the top of the grill lid 112. Referring to FIG. 1B, in accordance with a prior-art embodiment, such smoke stack or exhaust vent (hereinafter collectively referred to as "exhaust vent") may have a prior-art, manually-operated factory-installed damper assembly 120 that provides integral means for the operator of the grill to manually vary the flow passage area of the vent and thus throttle of the flow rate of air through the exhaust vent 122.

In an embodiment, and as shown in FIG. 1A, the prior-art, manually-operated factory-installed damper assembly 120 is removed from the embodiment illustrated in FIG. 1B, and replaced by an automated damper assembly 116. The grill configuration of FIGS. 1A and 2A illustrates a cooking region 216 that is situated in a direct airflow path between a combustion region 212 and a grill exhaust vent 122, though it will be apparent—for example, from the embodiments illustrated in FIGS. 2C and 2D described more fully hereinbelow—that other arrangements having combustion air inflow and outflow paths not in direct communication with the cooking region 216 are possible. It will be apparent that the present disclosure provides for an automated temperature control system 10 that may control temperature by adjusting dampers that are operatively associated with the flow of air through the combustion region 212.

As shown in FIGS. 1A and 2A, the automated damper assembly 116 of the present disclosure is coupled to a remote control module 118 by, for example, a control lead 220. At least one temperature probe lead 218 connects the remote control module 118 to an operating temperature probe 312, and optionally, to a food temperature probe 310, as will be described in more detail in connection with FIG. 3.

Figure 2B:
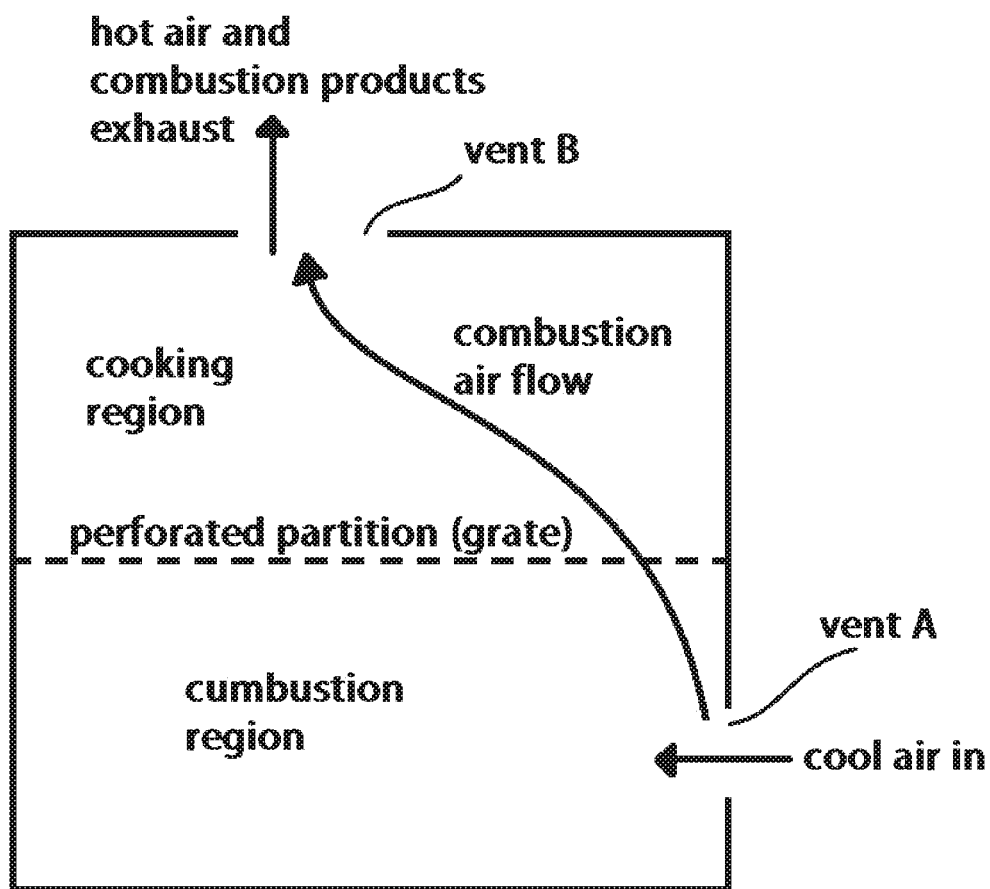
FIG. 2B is a schematic depiction of a configuration of a combustion region air flow path and cooking region air flow path in accordance with an exemplary embodiment of the present disclosure.
Figure 2C:
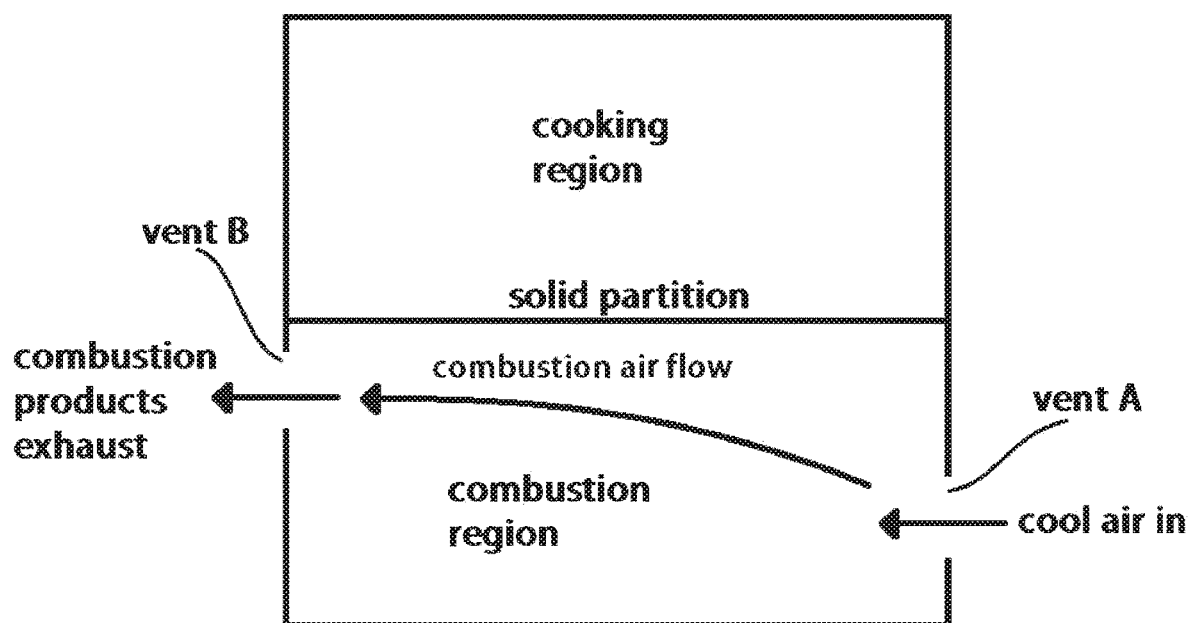
FIG. 2C is a schematic depiction of another configuration of a combustion region air flow path and cooking region air flow path in accordance with an exemplary embodiment of the present disclosure.
Figure 2D:
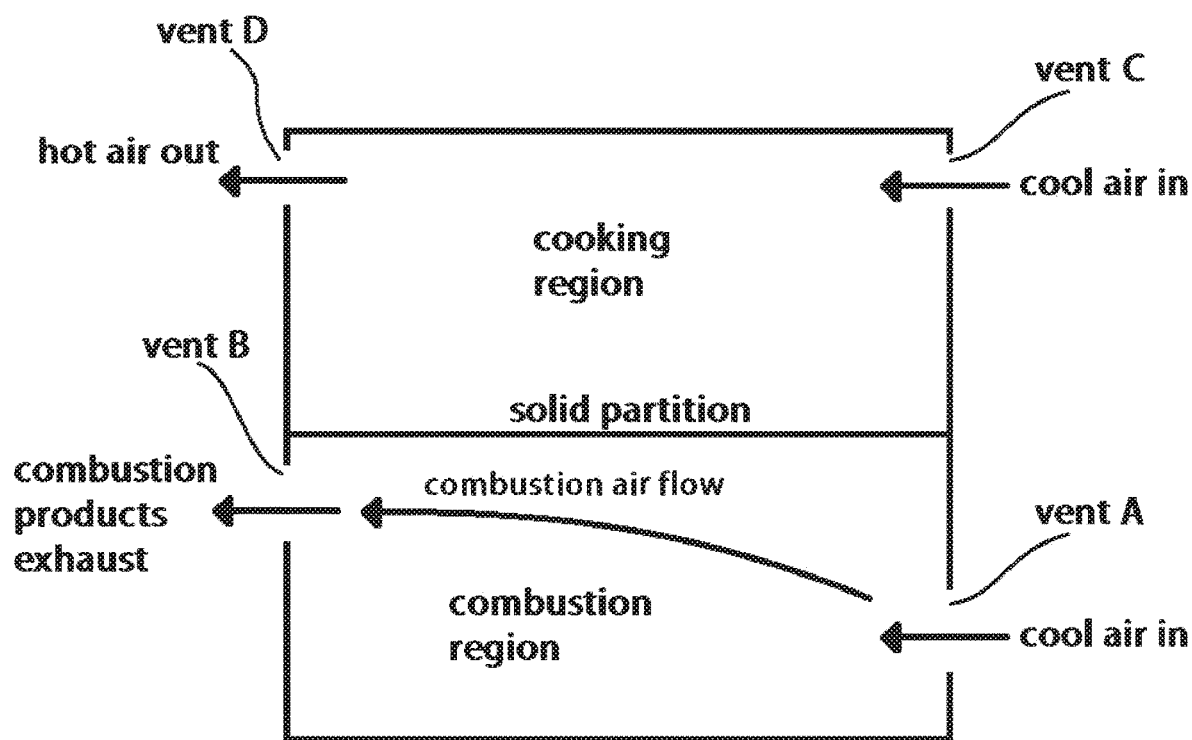
FIG. 2D is a schematic depiction of yet another configuration of a combustion region air flow path and cooking region air flow path in accordance with an exemplary embodiment of the present disclosure.

FIGS. 2B, 2C, and 2D illustrate possible configurations of combustion air flow paths and cooking region air flow paths of a grill. It will be apparent that a combustion region and a cooking region may or may not be contiguous volumes, and thus controlling combustion air flow rates would not necessarily control air flow rate through the cooking region. Referring to FIG. 2B, a combustion air flow path is disposed such that that air flow path passes through a cooking region before exiting a cooking region exhaust vent. FIG. 2C illustrates a grill configuration wherein the combustion region and cooking region are not a contiguous volume, and wherein the cooking region does not have an air flow path that is in communication with the ambient environment. FIG. 2D shows a grill configuration similar to that shown in FIG. 2C, with the addition of cooking region vents that permit an air flow path between the cooking region and the ambient environment. FIGS. 2B, 2C, and 2D represent configurations for which the automated temperature controller of the present disclosure is applicable, though it will be apparent that these should not be considered an exhaustive set of applicable configurations.

The automated temperature control system 10 of the present disclosure may be in series with at least one of vents analogous to "vent A" and "vent B" as shown in FIGS. 2B, 2C, and 2D. It will be apparent that FIGS. 2B, 2C, and 2D illustrate various environments in which the automated temperature control system 10 may be practiced. Further, it will be apparent that the automated temperature control system 10 is operatively associated with the combustion air flow path, but need not be associated with an air flow path that is in direct communication with the cooking region. Moreover, the automated temperature control system 10 disclosed herein may be incorporated in any structure that includes a plurality of regions, with one of the plurality of regions containing a combustible fuel supply.

Figure 3:
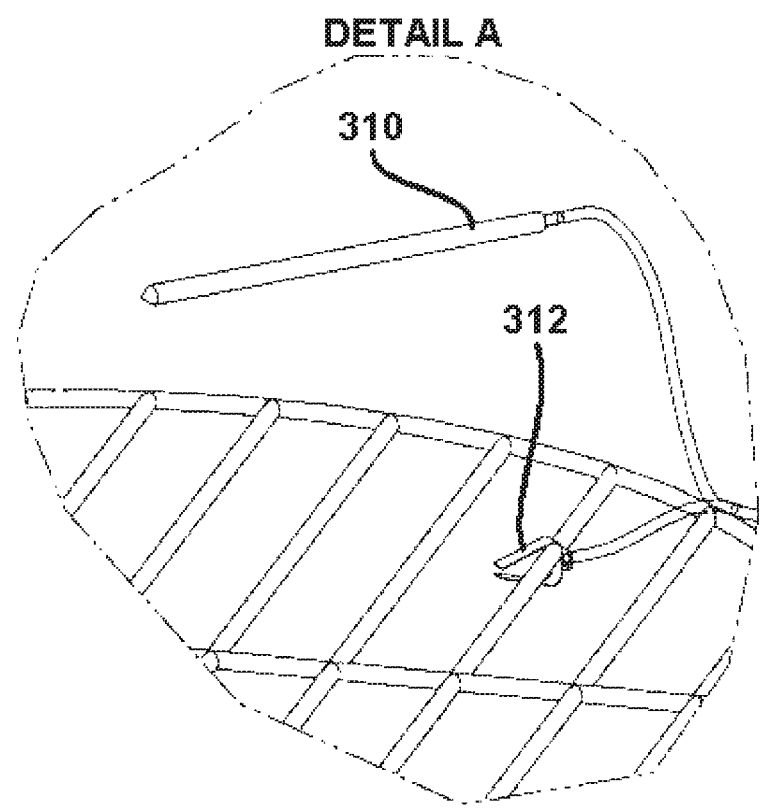
FIG. 3 is a fragmentary perspective view of food and operating temperature probes of an automated temperature control system, in accordance with an exemplary embodiment of the present disclosure.

Referring now to FIG. 3, Detail A illustrates an operating temperature probe 312 and an optional food temperature probe 310. Food temperature probe 310 may assist the user in determining the temperature of a food item that is being cooked on a grill, for example, but it will be apparent that food temperature probe 310 is not a requisite element of automated temperature control system 10. Operating temperature probe 312 is depicted, in an exemplary embodiment, as a clip-on probe attached to the food grate 214 or corresponding perforated or solid partition within the grill body 110. The food temperature probe 310 is preferably of the piercing type, as depicted in FIG. 3, Detail A. Although food temperature probe 310 and operating temperature probe 312 are shown to be thermocouple probes, it will be apparent that other temperature sensor types may be utilized, such as a resistive thermal detector (RTD), an infrared detector, a thermistor, or any other sensor that is capable of communicating temperature directly or indirectly to a microcontroller.

Figure 4:
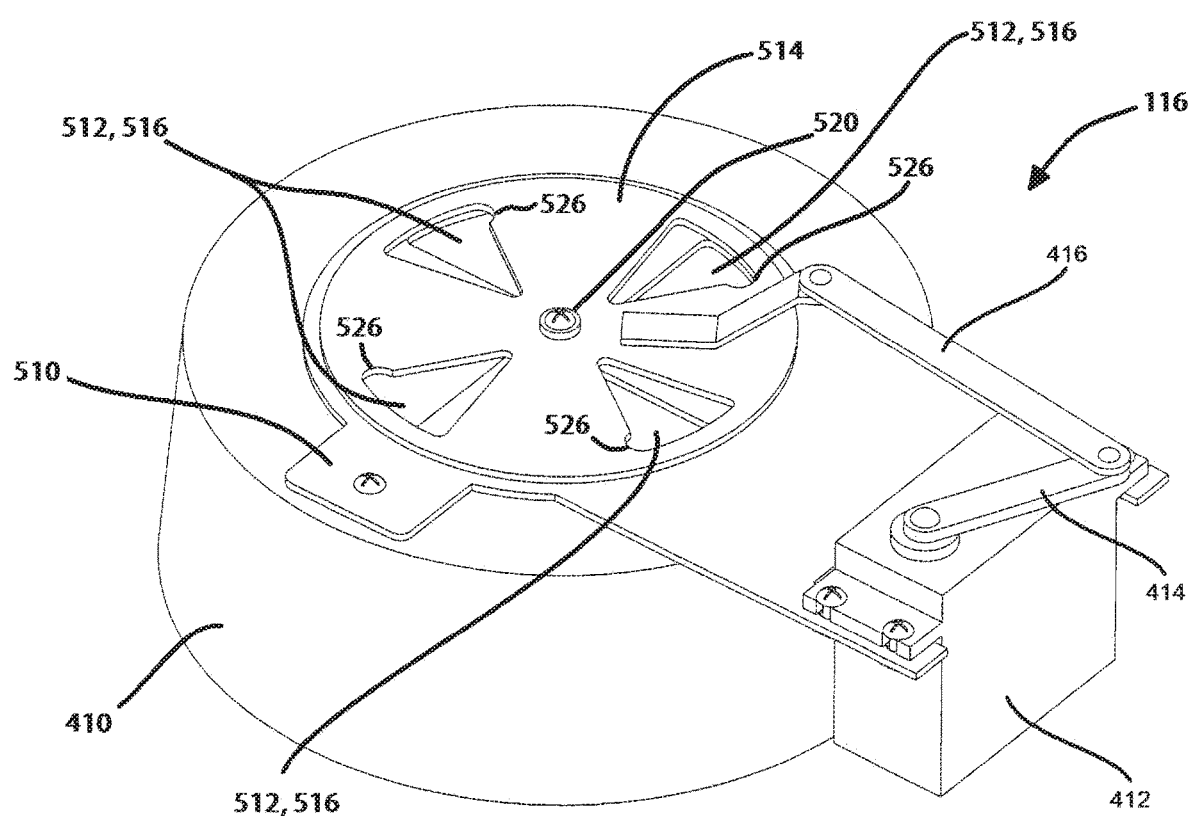
FIG. 4 is a view of an automated damper assembly of an automated temperature control system, in accordance with an exemplary embodiment of the present disclosure.
Figure 5:
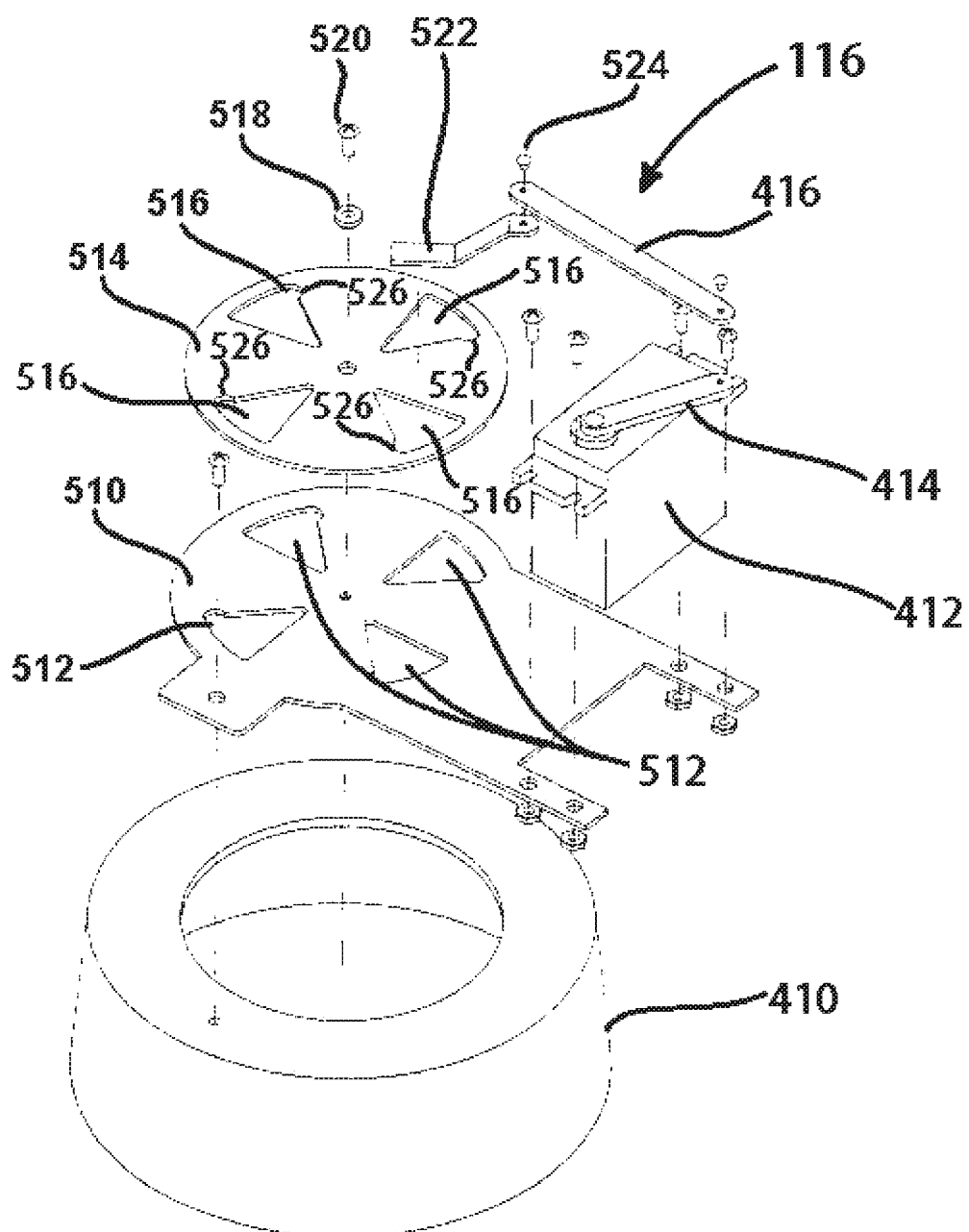
FIG. 5 is an exploded view of the automated damper assembly of FIG. 4.

Referring now to FIGS. 4 and 5, an exemplary embodiment of an automated damper assembly 116 of an automated temperature control system 10 is shown. In an embodiment, an automated damper assembly 116 comprises a base adapter 410 upon which is attached a base plate 510 having openings or base plate ports 512. A valve plate 514 sits concentrically (in an embodiment) atop base plate port 512 and has openings or ports 516 and is rotationally mobile relative to base plate 510. Port 512 is retained in the direction of its axis of rotation to valve plate 514 with a valve plate fastener 520, which fastener may comprise a screw and nut used in conjunction with a spacer or bushing 518 to prevent friction between valve plate 514 and base plate 510. An actuator control arm 414 is linked to a valve plate control arm 522 by a connecting rod 416, fastened with screws, rivets or other fastener 524 that permit rotational mobility. Actuator 412 (which is preferably electrically controlled) is fastened to base plate 510 with screws, nuts and bolts, rivets, or the like. Valve plate control arm 522 is attached to valve plate 514 by a weld or other attachment means that will not cause frictional interference between valve plate 514 and base plate port 510.

While the appended drawings illustrate an automated damper assembly 116 in connection with a "daisy wheel" venting or damper configuration, it will be apparent that the automated damper assembly 116 disclosed herein may incorporate other venting or damper configurations such as a louver or louvers, a butterfly valve, and the like.

When a grill is operated at a relatively low temperature, near 200° F. for example, very little fresh airflow is required in the combustion region 212. Therefore, when the airflow passage area of cooking region 216 is mostly closed, it is desirable for the shapes of base plate port 512 and valve port 516 to result a small area change per unit actuation of actuator 412, for example, as illustrated in FIGS. 4 and 5 by the semi-circular notches 526 distally located on one of the radial edges of each base plate port 512 and each valve port 516 in the base plate 510 and valve plate 514 respectively.

Figure 6:
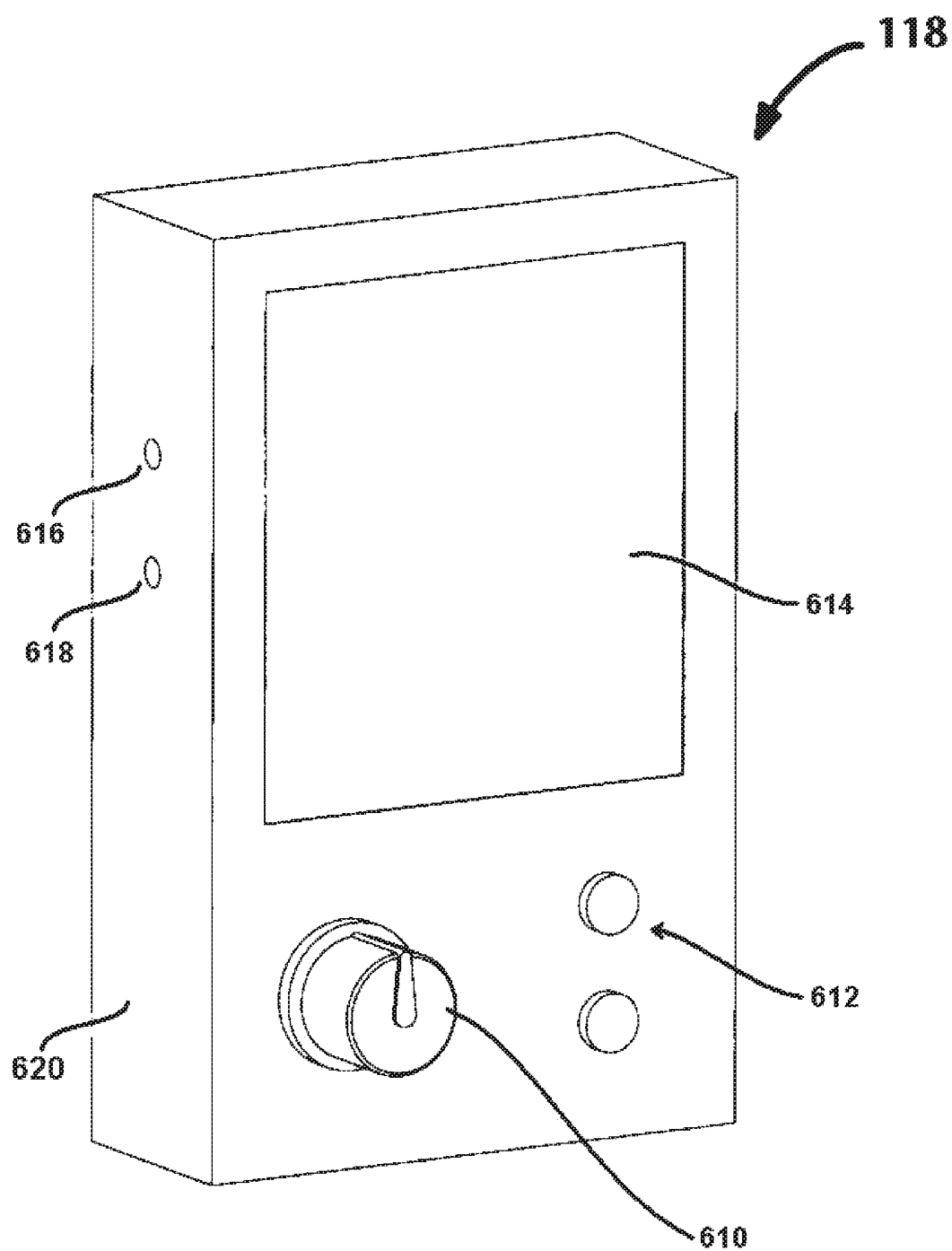
FIG. 6 is a front view of a remote control module of an automated temperature control system, in accordance with an exemplary embodiment of the present disclosure.
Figure 7:
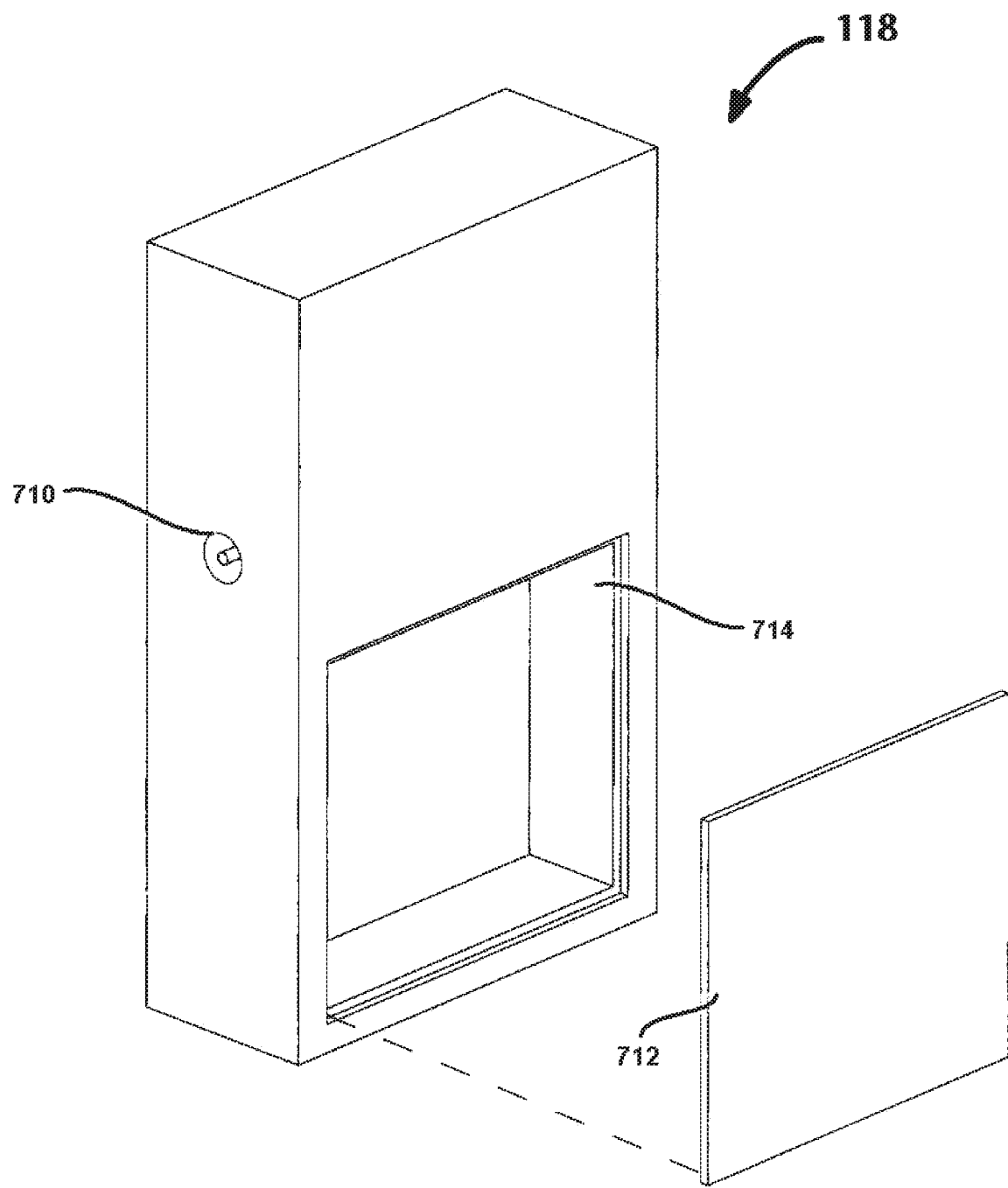
FIG. 7 is a rear view of the remote control module (with battery compartment open) of FIG. 6.

Shown in FIGS. 6 and 7 are front and rear perspective views of remote control module 118. Remote control module 118 is electrically powered by batteries (not illustrated) contained in a battery compartment 714 thereof, or by an external DC power source connected to remote control module 118 through an auxiliary power receptacle 710. Battery compartment 714 is accessible through removable cover 712. Enclosure 620 contains the requisite circuitry for processing signals received from operating temperature probe 312 and optional food temperature probe 310, for execution of a control algorithm and positioning actuator 412, and for interfacing with a user through visual display 614, rotary encoder 610 and user interface buttons 612. The control circuit connects with control lead 220 through controller lead receptacle 618 and connects with temperature probe lead 218 through temperature probe lead receptacle 616. In an embodiment, remote control module 118 includes user interface buttons 612 and rotary encoder 610 as user input components.

Figure 8:
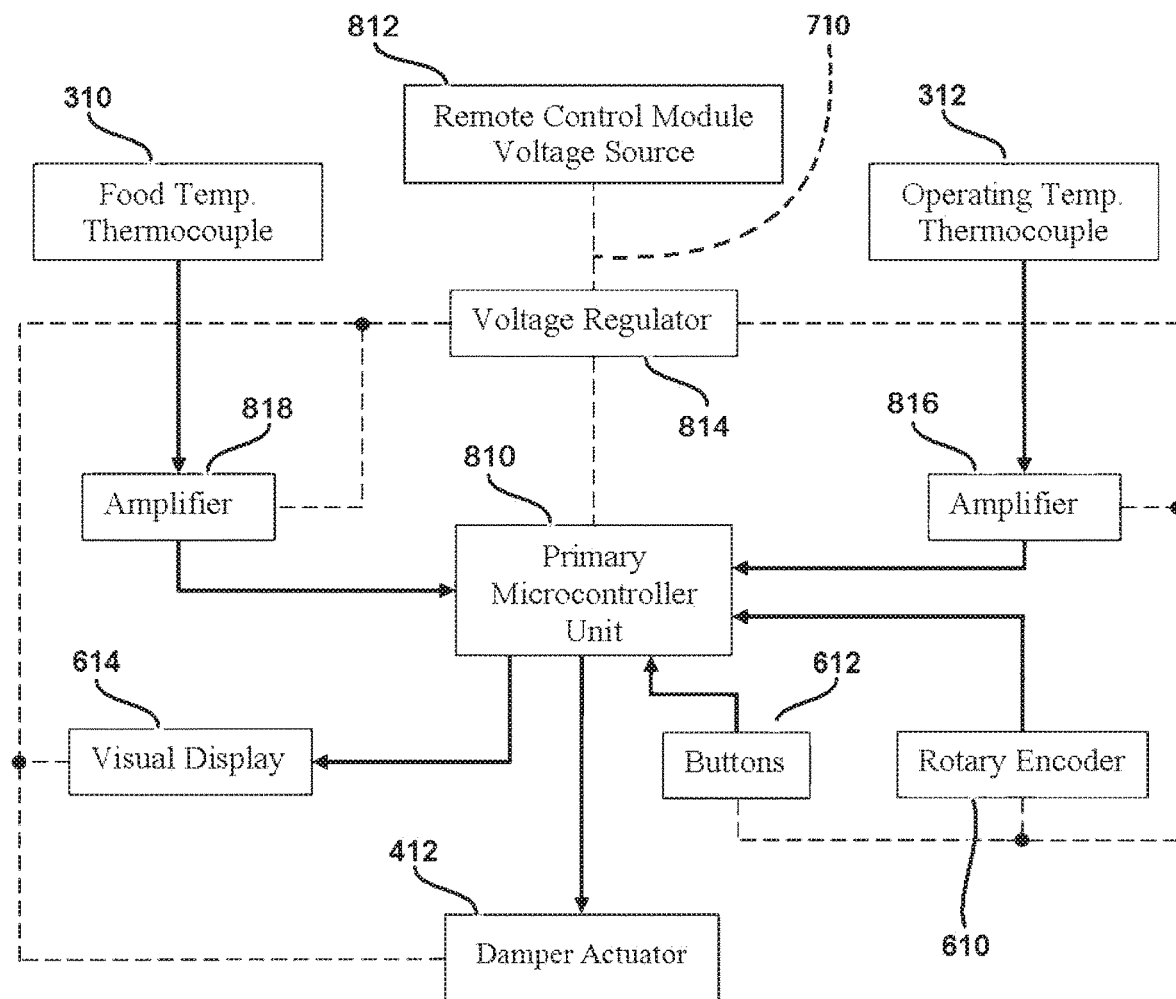
FIG. 8 is a block diagram of a primary control circuit of an automated temperature control system, in accordance with an exemplary embodiment of the present disclosure.

FIG. 8 is a block diagram of the primary control circuitry contained in enclosure 620. The dashed lines identify the electrical power source for each component, where applicable. The solid arrows indicate signal flow between components.

As shown in FIG. 8, the primary control circuitry of remote control module 118 has a voltage source 812 that is supplied either by batteries or from an external source connected to auxiliary power receptacle 710. The power source connected to power receptacle 710 may be an AC/DC wall outlet adapter, solar cells, external battery pack, automotive electrical adapter or the like. The voltage source is regulated by voltage regulator 814, which regulator may supply constant voltage to the rest of the circuit. The control circuit of FIG. 8 has a food temperature thermocouple amplifier 818 and an operating temperature thermocouple amplifier 816, which amplify the voltages generated by food temperature probe 310 and operating temperature probe 312, respectively. The system will further preferably comprise at least one thermocouple amplifier, a means of cold junction compensation, and analog-to-digital conversion of the resulting signal for communication to the primary digital microcontroller 810. Signals from food temperature thermocouple amplifier 818 and operating temperature thermocouple amplifier 816 are received by primary digital microcontroller 810 (in which microcontroller the primary control logic for the system is stored and executed). User interface buttons 612 and rotary encoder 610 are connected to primary digital microcontroller 810 as input devices. Primary digital microcontroller 810 is connected to and in communication with visual display 614 as an output device. In addition to primary control logic, primary digital microcontroller 810 contains additional logic for displaying information on visual display 614. In an embodiment, display 614 is a digital liquid crystal display. Visual display 614 preferably has an integral illumination capability so that remote control module 118 is easily operated in low light conditions. Visual display 614 may further comprise an integral driver chip to greatly simplify the control circuit of remote control module 118 and simplify the software requirements of primary digital microcontroller 810 for displaying information on display 614.

In an embodiment, primary digital microcontroller 810 communicates positioning signals to actuator 412 through control lead 220. Actuator 412 receives electrical power from voltage source 812 which is also transmitted through control lead 220. The illustrated actuator 412 is a basic water-resistant electric servo motor, though actuator 412 could similarly be any type of electrical stepper motor, servo, linear actuator or the like and could possibly include the use of gears, control arms, push rods or chains and sprockets to transmit motion to valve plate 514.

In addition to the control circuit components discussed above, a basic control circuit board also includes appropriate decoupling capacitors, ancillary resistors and other minor components not shown in FIG. 8. As these details are common to most digital circuits and are well understood by anyone skilled in the art of digital control design, they are not discussed in this document. Furthermore, it will be apparent that common user interface hardware selections may replace those illustrated in this embodiment without altering the ramifications of the automated temperature controller system 10 disclosed herein.

Figure 9:
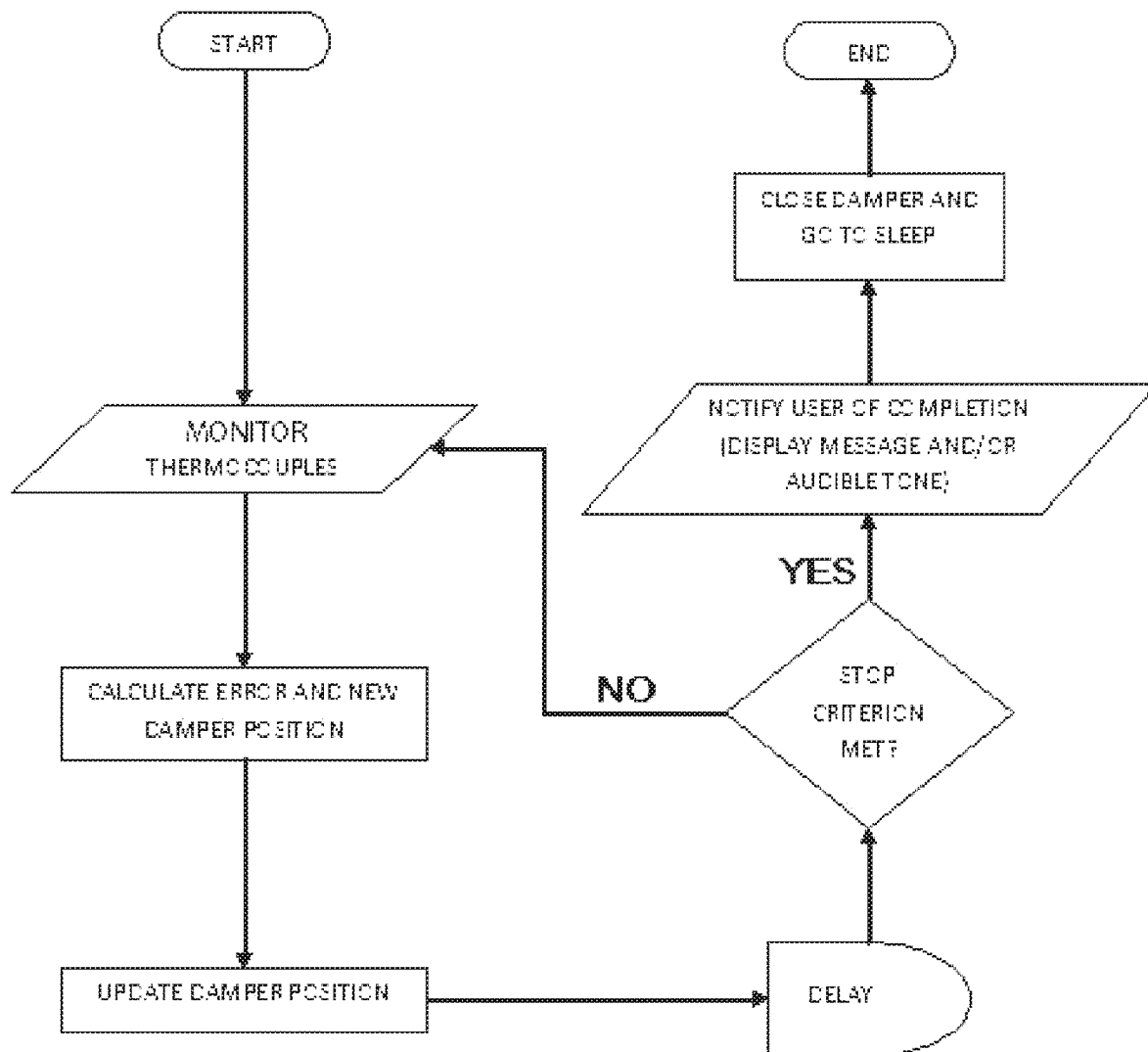
FIG. 9 is a primary controller logic flowchart for an automated temperature control system, in accordance with an exemplary embodiment of the present disclosure.

FIG. 9 illustrates the primary control logic software flow of primary logic microcontroller 810. The logic of FIG. 9 is discussed in the following example:

Example 1: Operation of Exemplary Embodiment

The exemplary embodiment shown in FIG. 1A depicts a grill wherein automated damper assembly 116 is disposed atop grill exhaust vent 122 (the latter illustrated in FIG. 1B), with the automated damper assembly 116 held in place by gravity. Automated damper assembly 116 is installed by removing existing grill exhaust vent 120 and replacing it with automated damper assembly 116, which will be configured to adapt to the dimensions of the grill on which the assembly is installed. While this is an exemplary means of attachment for automated damper assembly 116, alternative means of attachment for further embodiments may include use of a magnetic base or other mechanical fasteners, including mounting brackets that are attached by screws or bolts. Another attachment means includes a base adapter that may be left on the grill from which the remainder of the damper unit is readily detachable. The attachment between the primary unit and the base adapter may also be screw threads, a twist/lock mechanism, interference fit, magnetic coupling, or some type of simple clamping scheme.

It should be noted that some commercially available grills possess exhaust vent dampers that are not easily removed (as they are connected with welds, rivets or other similar fastening means). These dampers are commonly of the "daisy wheel" type. For this type of configuration the user of automated damper assembly 116 may set the existing daisy wheel damper of the grill to its fully-opened position and thereafter attach automated damper assembly 116 over the top of it. In this configuration, the automated damper assembly 116 supersedes the existing damper of the grill.

In an embodiment, automated damper assembly 116 is configured as an exhaust vent damper located on grill lid 112 of a solid-fueled grill, though automated damper assembly 116 may also be connected to an inlet vent or exhaust vent positioned elsewhere on a grill. The particular embodiment of FIG. 1A, wherein automated damper assembly 116 is configured as an exhaust vent damper is chosen for illustrative purpose because many solid-fueled grills possess only one exhaust vent which is conveniently located for application of automated damper assembly 116.

For improved temperature control efficacy, it is preferable that automated damper assembly 116 be in series with either an inlet or exhaust passage through which all of the combustion airflow passes, such that automated damper assembly 116 is fully and operatively coupled to the components of the grill that may be adjusted to determine cooking temperature. If automated damper assembly 116 is incorporated in or on a grill which has multiple exhaust vent dampers and automated damper assembly 116 is also to serve as an exhaust damper, all exhaust dampers other than the one replaced by automated damper assembly 116 would be closed. Likewise, if automated damper assembly 116 is incorporated on or in a grill having multiple inlet dampers 114, and automated damper assembly 116 is to serve as an inlet damper, all inlet dampers other than the one replaced by automated damper assembly 116 would be closed.

The user connects actuator 412 to remote control module 118 with control lead 220. Operating temperature probe 312 is preferably installed in proximity to cooking region 216 by clipping operating temperature probe 312 to food grate 214 (as shown in FIG. 2A and FIG. 3 Detail A), or by any other suitable means. Before the grill is ignited, optional food temperature probe 310 may be positioned anywhere, either inside or outside of the grill. Operating temperature probe 312 and optional food temperature probe 310 are connected to remote control module 118 by temperature probe leads 218.

To begin a cooking cycle, the grill operator (i.e., user) ignites fuel contained in combustion region 212 by any known means. Grill ignition is typically conducted with all vent dampers set fully open. During grill ignition, remote control module 118 may remain powered off, permitting the user to manually position automated damper assembly 116 to a fully open position. Once appropriate combustion levels are established in combustion region 212 the user places the food item(s) to be cooked on food grate 214, and food temperature probe 310 may optionally be inserted into the food item so that the internal temperature of the food may be monitored throughout the cooking cycle by remote control module 118 and displayed on visual display 614. Any auxiliary exhaust airflow paths would be closed in order to give automated damper assembly 116 maximum control over the flow of fresh air through combustion region 212.

With an appropriate level of combustion established in combustion region 212 the grill operator will activate remote control module 118 by interfacing with the digital controller through visual display 614, rotary encoder 610 and user interface buttons 612. Visual display 614 may be an LCD or LED display, or the like, and may include a capacitance-type "touch screen." In an embodiment, the target operating temperature is set by first pushing one of user interface of buttons 612 to enter target temperature input mode. The user thereafter may rotate rotary encoder 610 clockwise to increase the target operating temperature from a default value or counterclockwise to decrease the target temperature from a default value.

The user-specified target temperature is displayed on visual display 614, which is updated by the software of primary digital microcontroller 810 as the target temperature is changed by the user. The user then presses one of user interface buttons 612 again to return the microcontroller software from the temperature set mode back to the main operating loop described in FIG. 9. In a similar manner, a target cooking temperature or temperature profile may be set by the user. Various settings and menu options are accessible to the user through use of user interface buttons 612 and rotary encoder 610. For example, the user may set a target temperature of 250° F. for the first four hours with the temperature to change automatically to 190° F. thereafter for the remainder of the specified duration of the cooking cycle. Also using user interface buttons 612 and rotary encoder 610 in a similar fashion as described above, the user may optionally input a target food temperature. The user can then choose a cooking cycle completion criterion to be one of either a maximum cooking cycle time, or the internal food temperature reaching a specified target value.

Upon initiation of a cooking cycle, the software installed in the primary digital microcontroller 810 operates in accordance with the continuous loop illustrated in FIG. 9 until the user turns off the controller, or the specified cooking cycle completion criterion is met.

The temperature of cooking region 216 is controlled by modulation of the burn rate of the charcoal, wood, or other solid fuel source contained in combustion region 212. Temperature control is exercised by the regulation of the outflow of hot exhaust gases through grill exhaust vent 122, by mechanical actuation of the rotational position of valve plate 514. This actuation permits adjustment of the relative positions of valve ports 516 and base plate ports 512, and thus the overlapping airflow passage area of valve ports 516 and base plate ports 512. Due to continuity, controlling the flow rate of exhaust gases from the grill will directly affect the inflow rate of combustible fresh air through inlet damper 114 to combustion region 212, and thus the operating temperature of the grill.

An exemplary description of the control provided by the system is as follows: If the operating temperature of cooking region 216 is above the specified target operating temperature, remote control module 118 will tend to reduce the exhaust airflow passage area of valve plate 514 by sending appropriate signals to actuator 412 via control lead 220. If the operating temperature of cooking region 216 is below the specified target temperature, remote control module 118 will tend to increase the exhaust airflow passage area of valve plate 514 by sending an appropriate signal to actuator 412 via control lead 220. Reducing the exhaust airflow rate through cooking region 216 will result in decreased airflow through inlet damper 114 and combustion region 212. This reduction of airflow will retard combustion processes occurring in combustion region 212 and therefore lead to a reduction in operating temperature in cooking region 216. Conversely, increasing the exhaust airflow rate through valve plate 514 will result in increased airflow through inlet damper 114 and combustion region 212. This increase of airflow will accelerate combustion processes occurring in combustion region 212 and will therefore lead to an increase in operating temperature in cooking region 216.

In an exemplary embodiment, the control algorithm software of primary digital microcontroller 810 is based on typical Proportional Integral Derivative (PID) control theory. (It will be apparent that the control algorithm described herein is exemplary only, and that any other suitable control algorithm known in the art may be incorporated in the automated temperature control system 10.) A standard PID function is used to compute and set the position of valve plate 514 with each pass through the logic shown in FIG. 9. The position of valve plate 514 is calculated according to the following equation:

$$\text{Position} = k_p \cdot E + k_I \cdot \sum E + k_d \cdot \frac{dE}{dt}$$

In the above equation, E is the current operating temperature error, defined as the difference between target temperature and current operating temperature of cooking region 216. The three terms on the right side of the equation are generally referred to, from left to right, as proportional, integral, and derivative terms, respectively. The k-coefficients are constants (also known as "gains") associated with each term, and can be optimized to minimize the settling time of the control and to minimize operating temperature rise time and overshoot of the target temperature from transient states.

With each pass through the logic of FIG. 9, error is recalculated and that updated value affects each of the three terms of the position equation. The calculations from the equation potentially result in an updated position of valve plate 514 with each loop through the main control logic of FIG. 9.

Once a nominally correct valve plate 514 position is established and steady-state operating temperature in cooking region 216 equaling the target temperature is attained, valve plate 514 will remain still until a disturbance of some kind perturbs the system from equilibrium. Any persistent perturbation such as a change in fuel characteristics, changing ambient conditions, or food drippings reaching the fuel in combustion region 212, will drive valve plate 514 to a new nominally correct position, maintaining zero steady-state operating temperature error.

It will be apparent that the above description of PID control is merely intended to be illustrative of the behavior of the automated temperature control system 10. A basic awareness of this type of control helps illustrate how and why the automated temperature control system 10 disclosed herein will yield accurate steady-state temperature control while maintaining low power requirements, though the control algorithm may be an appropriate scheme other than PID control.

Because the appropriate position of valve plate 514 for steady operation at a given target temperature tends to change slowly in the absence of significant disturbances, valve plate 514 may move only slightly and infrequently throughout the course of the cooking operation. Because of this characteristic, the energy requirements of automated damper assembly 116 can be much lower than those of a forced air (blower) type of temperature controllers which would pump air through the system upon demand for heat until the end of the cooking cycle. Reduced energy requirements become increasingly important for very long multi-hour cooking operations, particularly if the electrical energy source is supplied by batteries or a similarly limited power source.

Figure 10:
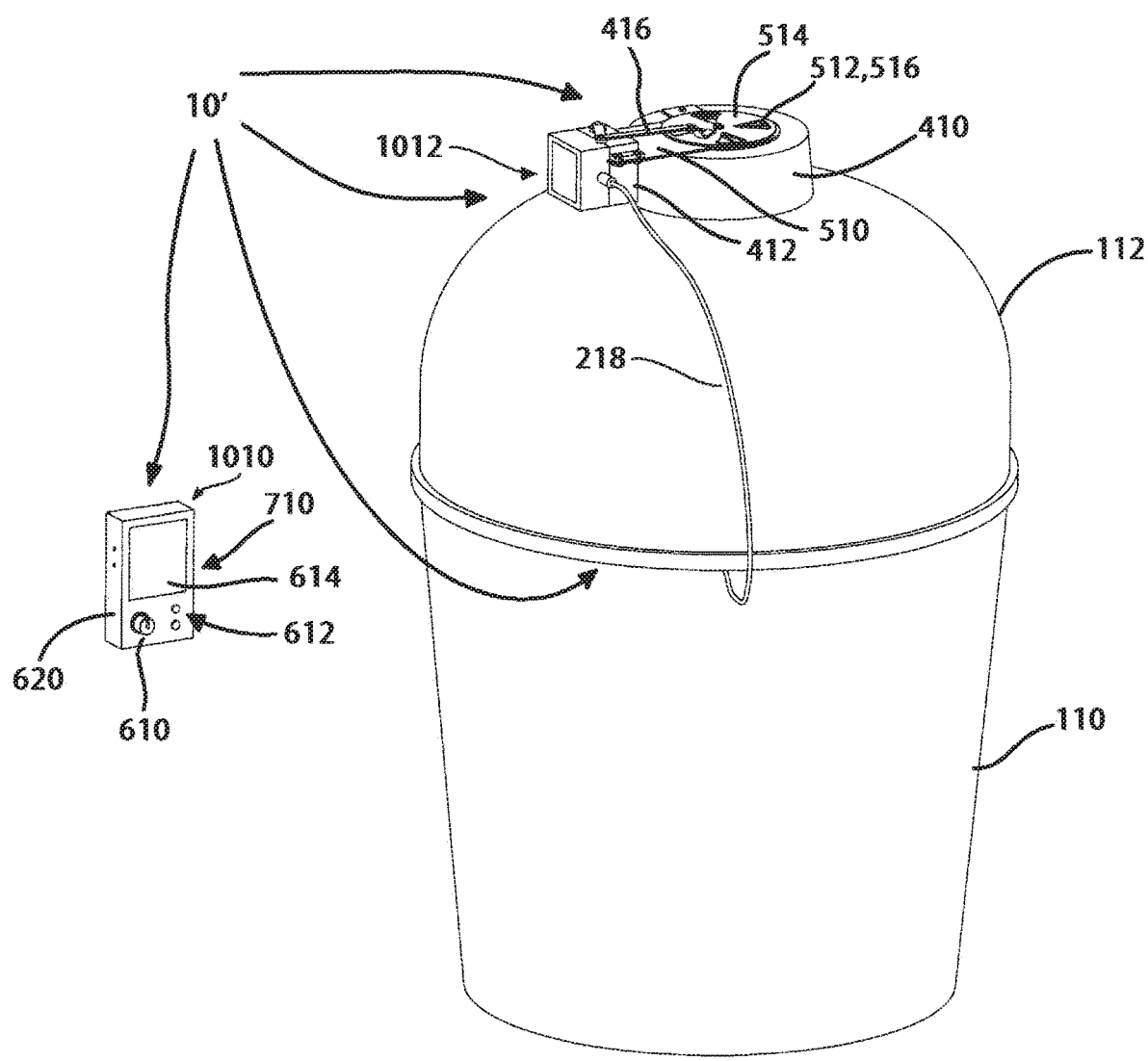
FIG. 10 is a rear perspective of another embodiment of an automated temperature control system, in accordance with an exemplary embodiment of the present disclosure, installed on a typical grill.

Referring now to FIG. 10, a rear perspective view of a second embodiment of an automated temperature control system 10' installed on a typical grill is shown. The illustrated grill is the same as that described in FIGS. 1A and 2A. In the embodiment shown in FIG. 10, the automated temperature control system 10' comprises the following primary components: a wireless automated damper assembly 1012, a wireless remote control module 1010, and a temperature probe lead 218, which operate in conjunction with operating temperature probe 312 and optional food temperature probe 310.

Wireless automated damper assembly 1012 is in communication with wireless remote control module 1010 through radio frequency signals. This wireless configuration benefits the user by allowing them to travel away from the grill while still observing the operating status of the system. Wireless remote control module 1010 may only differ from remote control module 118 with respect to its internal control circuitry and the software thereof. The enclosure and user interface hardware, as well as many of the internal circuit components of wireless remote control module 1010 may otherwise be same as remote control module 118. For convenience of discussion, reference numerals of FIGS. 6 and 7 will apply for wireless remote control module 1010.

Figure 11:
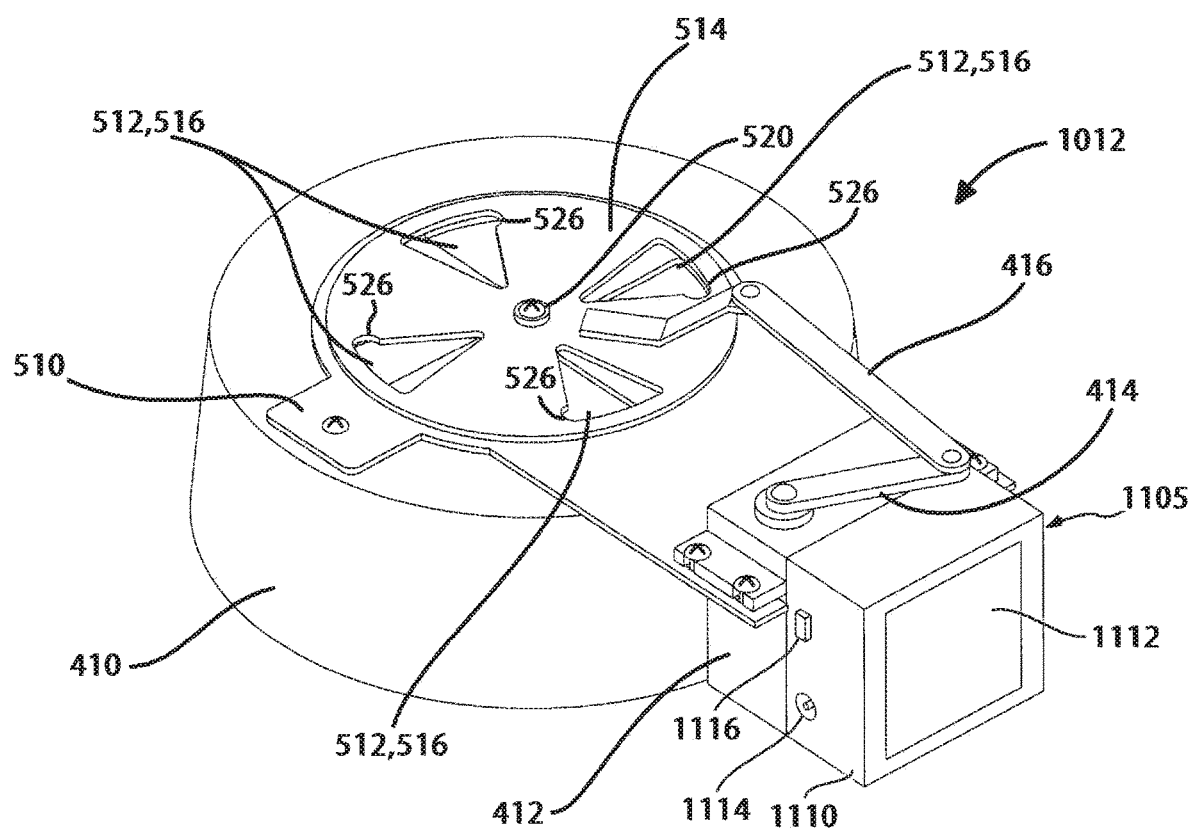
FIG. 11 is a front view of an automated damper assembly of an automated temperature control system, in accordance with another exemplary embodiment of the present disclosure.
Figure 12:
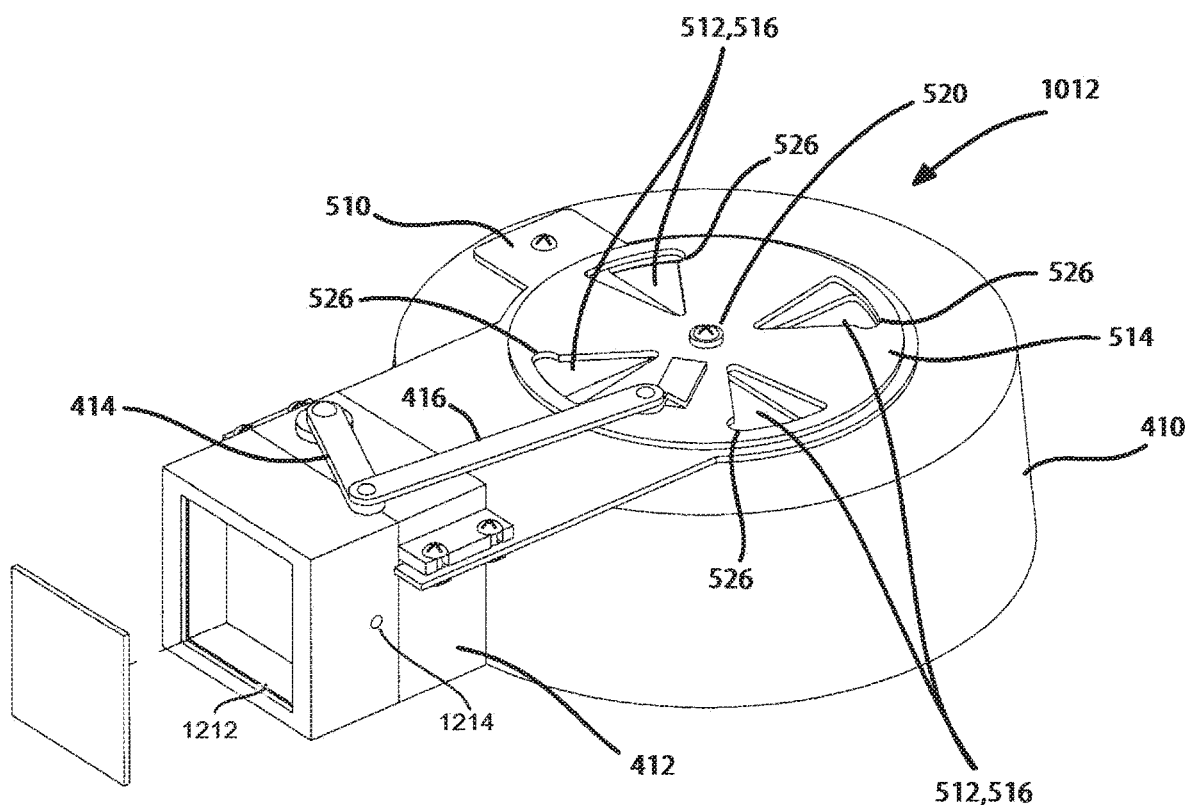
FIG. 12 is a rear view of the automated damper assembly of FIG. 11.

FIGS. 11 and 12 show wireless automated damper assembly 1012 from front and rear perspective views, respectively. In the present embodiment, wireless automated damper assembly 1012 comprises components of automated damper assembly 116 and further comprises a wireless local control module 1105. FIG. 11 illustrates an exemplary coupling between wireless automated damper assembly 1012 and actuator 412, though it will be apparent that other configurations may be employed. Wireless local control module 1105 and wireless remote control module 1010 each contain control circuitry that will be described below. The aforementioned control circuitry of wireless local control module 1105 is contained in wireless local control module enclosure 1110. In addition to control circuitry, wireless local control module enclosure 1110 houses battery compartment 1212 having a battery compartment cover 1112. Auxiliary power receptacle 1114 permits connection to alternative power sources in the event that the operator wishes not to use batteries to power wireless local control module 1105. Power button 1116 is used to power wireless local control module 1105 on and off. Operating temperature probe 312 and optional food temperature probe 310, when present, are connected to temperature probe lead receptacle 1214 by temperature probe leads 218.

Figure 13:
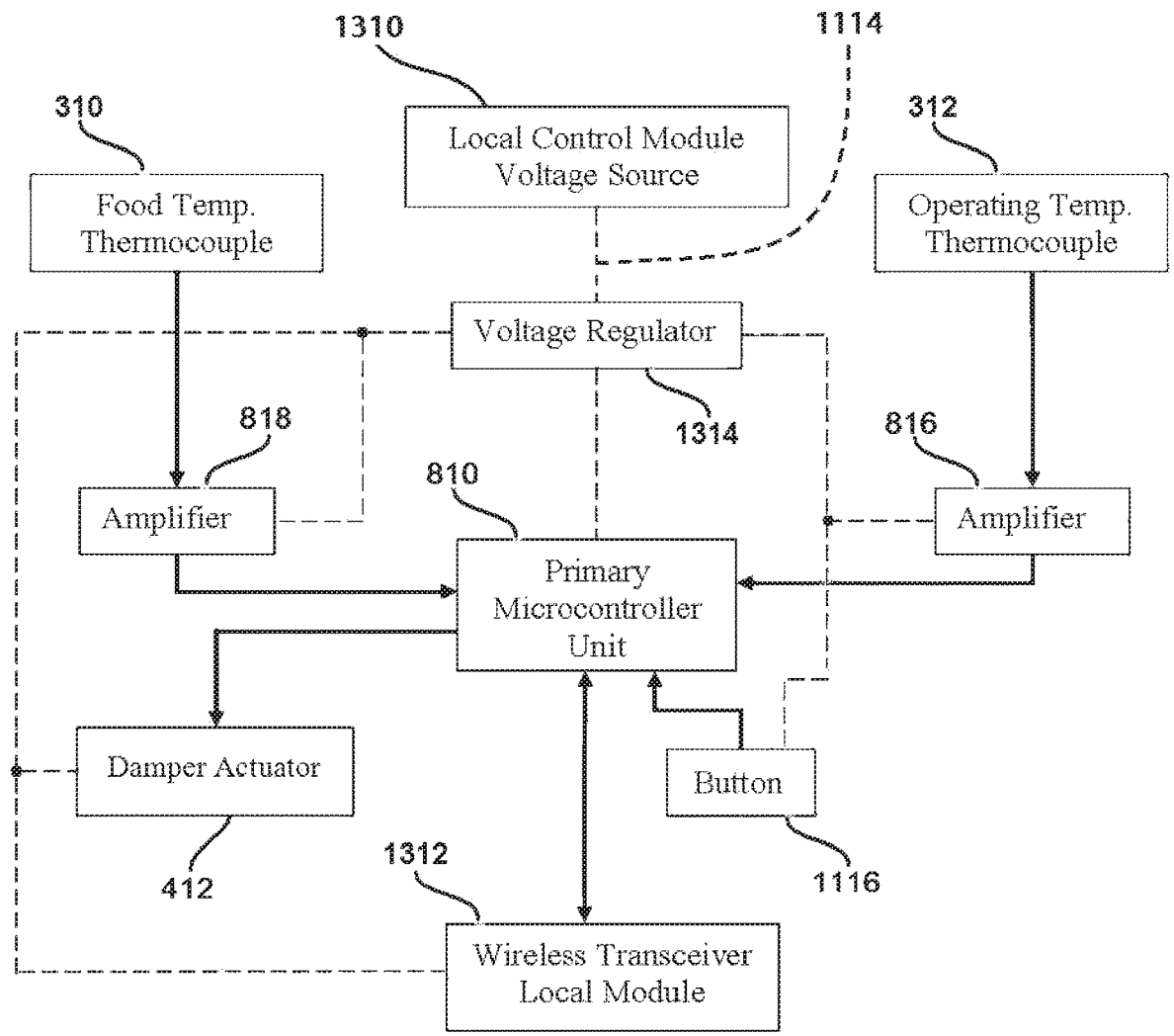
FIG. 13 is a block diagram of a primary control circuit of an automated temperature control system, in accordance with another embodiment of the present disclosure.

FIG. 13 is a block diagram of the primary control circuitry of wireless local control module 1105 located in wireless local control module enclosure 1110. The dashed lines identify the electrical power source for each component, where applicable. The solid arrows indicate signal flow between components.

As described in FIG. 13, the primary control circuit includes voltage source 1310 that is supplied either by batteries in battery compartment 1212 or from an optional external source connected to auxiliary power receptacle 1114. The power source connected to auxiliary power receptacle 1114 may be an AC to DC wall adapter, solar cells or the like. The voltage source is regulated by voltage regulator 1314, which then supplies a constant voltage to the rest of the circuit. The primary control circuit includes operating temperature thermocouple amplifier 816 and an optional food temperature thermocouple amplifier 818, which amplify the voltages generated by food temperature probe 310 and operating temperature probe 312, respectively. Signals from food temperature thermocouple amplifier 818 and operating temperature thermocouple amplifier 816 are received by primary digital microcontroller 810 wherein the primary control logic for the automated temperature control system 10' is stored and executed. Power button 1116 is connected to primary digital microcontroller 810 as an input device and serves as a power on/off button for wireless local control module 1105. Primary digital microcontroller 810 sends positioning signals to actuator 412 through a physical wire path internal to wireless local control module 1105. Actuator 412 receives electrical power from voltage source 1310, which is also transmitted through a physical wire path integral to wireless local control module 1105. Primary digital microcontroller 810 is connected to and in communication with local wireless transceiver module 1312, for sending signals to and receiving signals from remote wireless transceiver module 1412 of wireless remote control module 1010. Primary digital microcontroller 810 is programmed with logic to drive communication between local wireless transceiver module 1312 and remote wireless transceiver module 1412. It will be apparent that a radio transceiver or other frequency communication module will facilitate communication between local wireless transceiver module 1312 and remote wireless transceiver module 1412.

Figure 14:
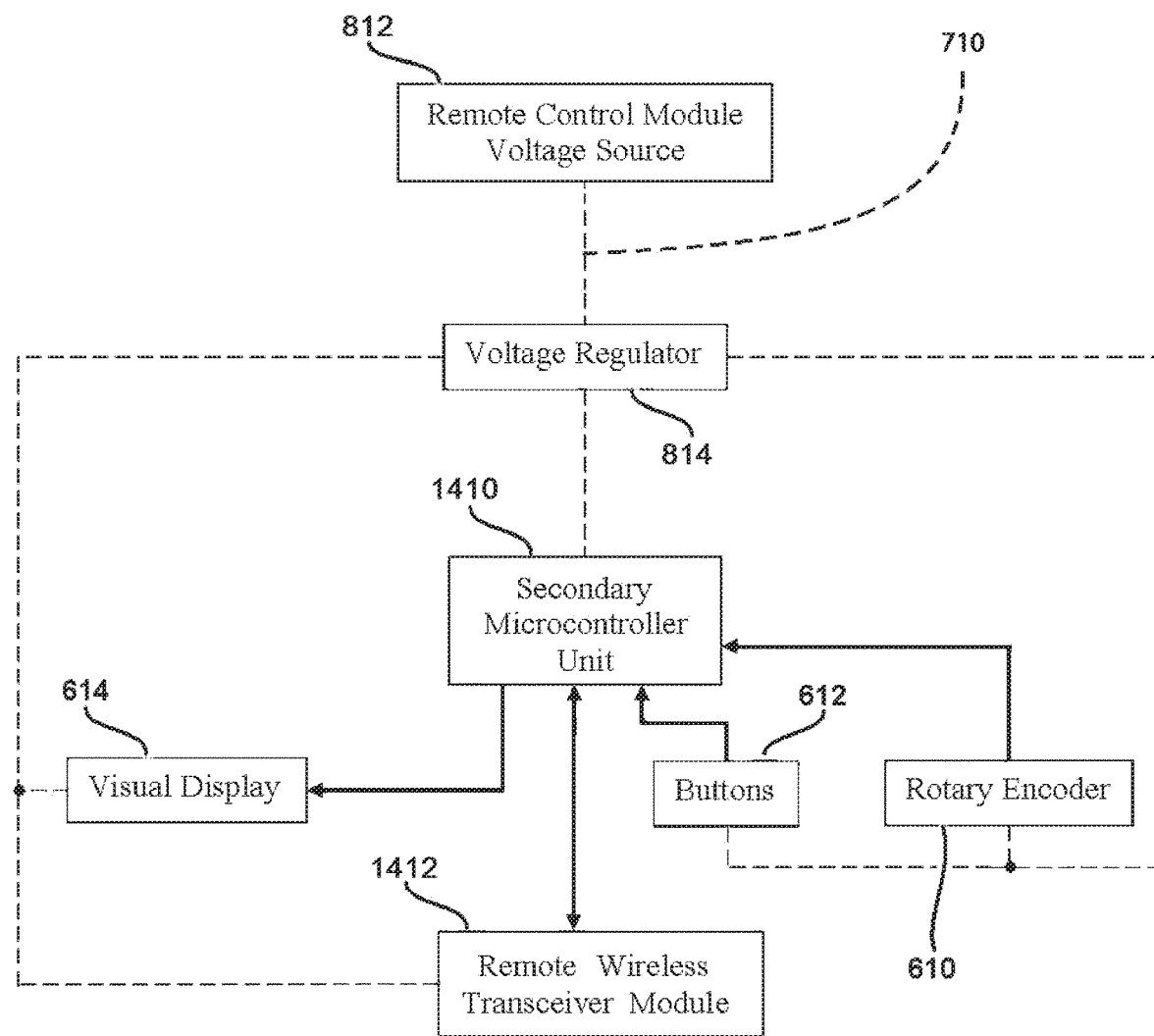
FIG. 14 is a block diagram of a secondary control circuit of an automated temperature control system, in accordance with another embodiment of the present disclosure.

FIG. 14 shows a block diagram of the secondary control circuitry contained within enclosure 620 of wireless remote control module 1010. The dashed lines identify the electrical power source for each component where applicable. The solid arrows indicate signal flow between components.

The control circuitry of wireless remote control module 1010 includes voltage source 812 that is supplied either by batteries in battery compartment 714 or from an external source connected to auxiliary power receptacle 710. The power source connected to auxiliary power receptacle 710 may be an AC to DC wall adapter, solar cells or the like. The voltage source is regulated by voltage regulator 814, which then supplies a constant voltage to the rest of the circuit. Secondary digital microcontroller 1410 is connected to and in communication with visual display 614 as an output device. User interface buttons 612 and rotary encoder 610 are connected to secondary digital microcontroller 1410 as input devices. In this exemplary embodiment, secondary digital microcontroller 1410 is programmed with logic for displaying information on visual display 614 as well as logic to drive communication between local wireless transceiver module 1312 and remote wireless transceiver module 1412. Note that for the illustrated embodiment, that secondary digital microcontroller 1410 is not programmed with the PID logic (or other chosen control algorithm that may be incorporated in the automated temperature control system 10' for executing instructions), because primary digital microcontroller 810 of wireless local control module 1105 is tasked with the control calculations and commanding movement of actuator 412.

Figure 15:
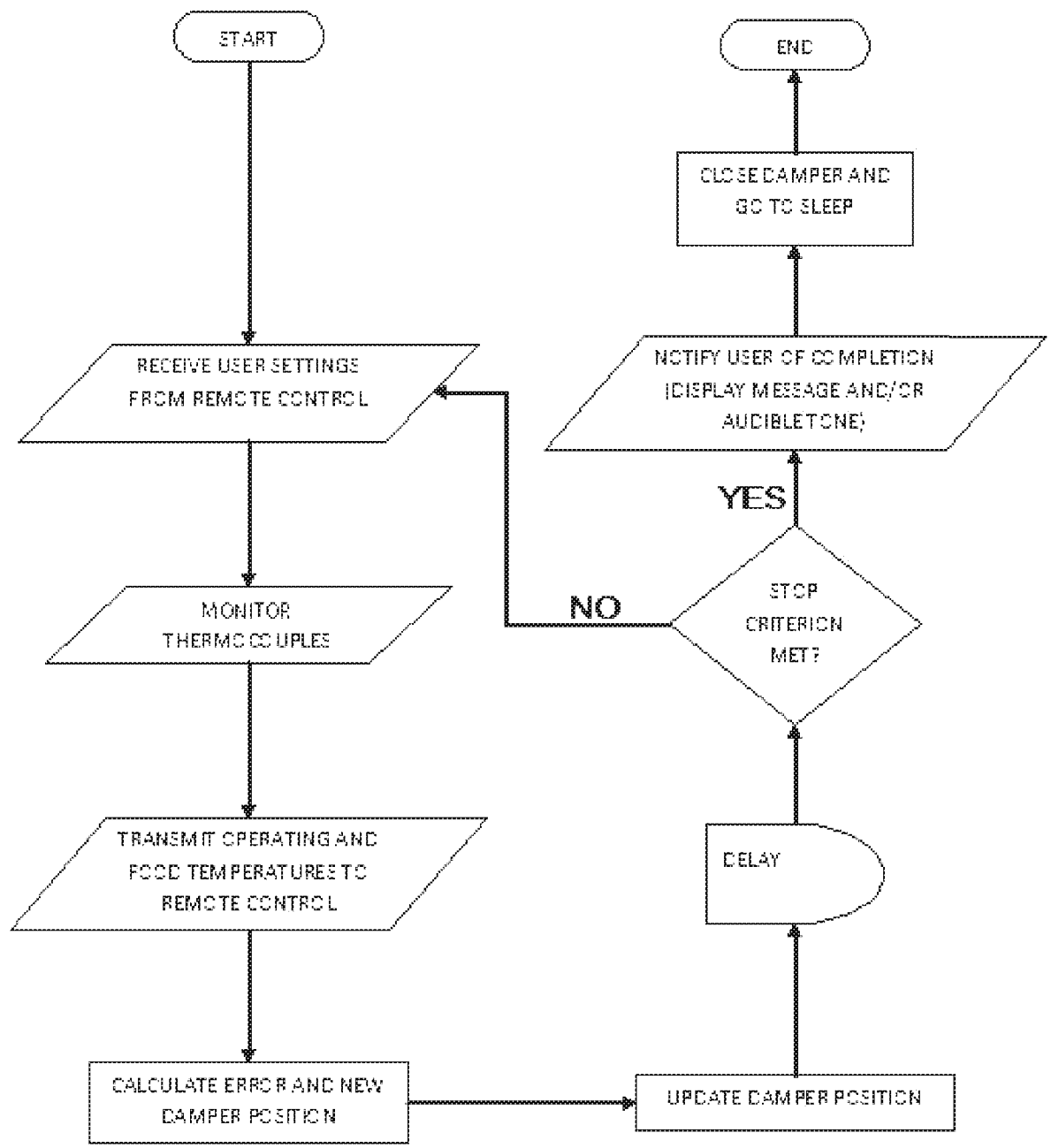
FIG. 15 is the primary controller logic flowchart of an automated temperature control system, in accordance with another embodiment of the present disclosure.

FIG. 15 illustrates the primary control logic software flow of primary digital microcontroller 810, which is a component of wireless automated damper assembly 1012 in the present embodiment. Primary digital microcontroller 810 is responsible for executing the primary control logic and controlling actuator 412, subject to the settings received from wireless remote control module 1010. Furthermore, primary digital microcontroller 810 is responsible for sending temperatures measured by food temperature probe 310 (when present) and operating temperature probe 312 to wireless remote control module 1010 so that they may be displayed to the user on visual display 614.

Figure 16:
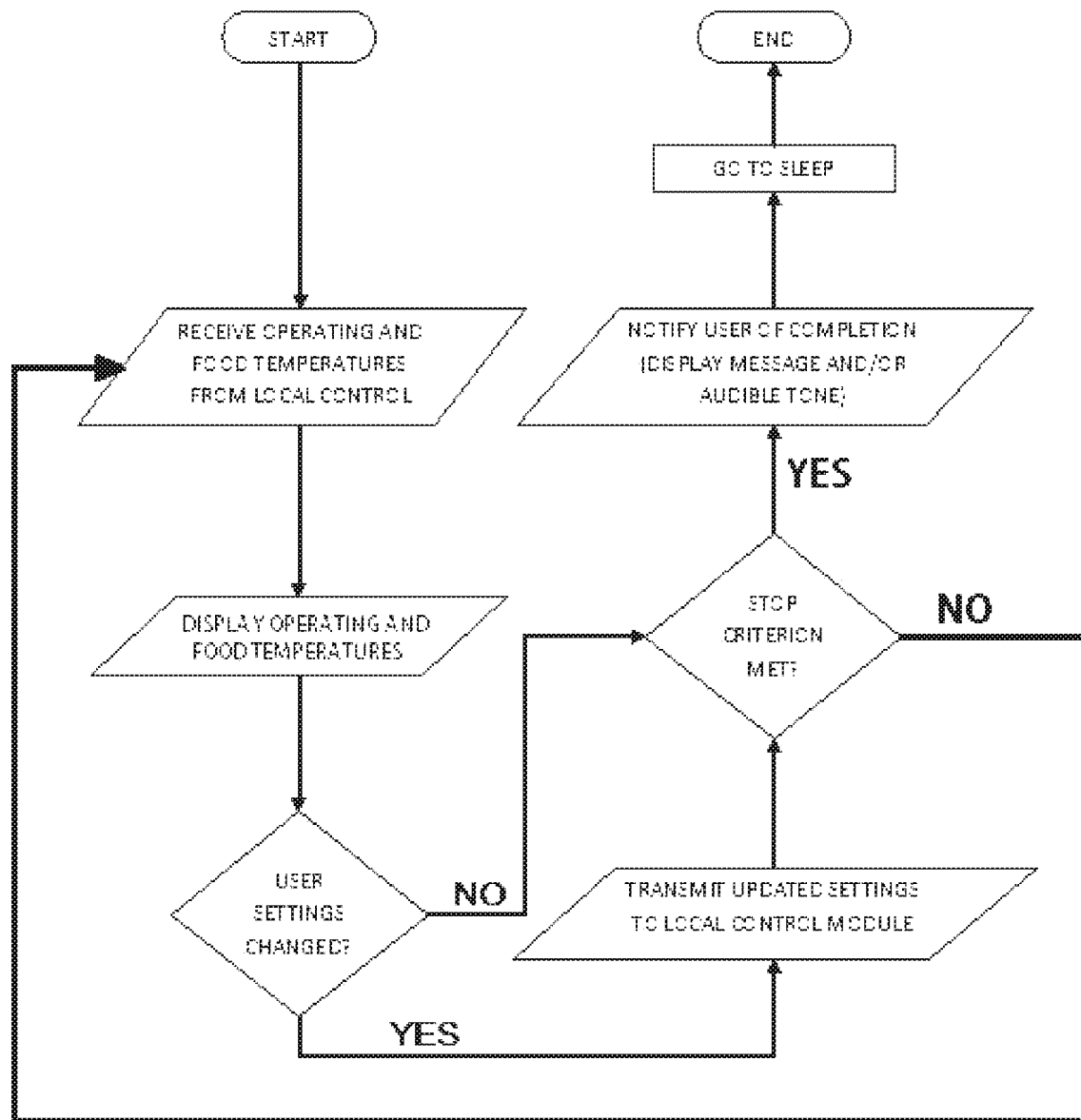
FIG. 16 is the secondary controller logic flowchart of an automated temperature control system, in accordance with another embodiment of the present disclosure.

FIG. 16 illustrates the secondary control logic software flow of secondary digital microcontroller 1410, which is a component of wireless remote control module 1010 in this exemplary embodiment. Secondary digital microcontroller 1410 is programmed to relay user-specified settings or inputs to wireless local control module 1105. Furthermore, secondary digital microcontroller 1410 is programmed to receive temperatures measured by food temperature probe 310 (when present) and operating temperature probe 312 wirelessly. All wireless communication between wireless remote control module 1010 and wireless local control module 1105 is accomplished by way of local wireless transceiver module 1312 and remote wireless transceiver module 1412. Secondary digital microcontroller 1410 is programmed to display current temperatures of food temperature probe 310 (when present) and operating temperature probe 312 on visual display 614 for the duration of the cooking cycle.

Example 2: Operation of Another Exemplary Embodiment

Operation of such an embodiment of the automated temperature control system 10' is similar to operation of the previous embodiment of the automated temperature control system 10, with certain distinctions to be discussed herein. Prior to the start of a cooking cycle, operating temperature probe 312 (and optionally, food temperature probe 310) are connected to temperature probe lead receptacle 1214 of wireless local control module 1105 by temperature probe leads 218. The automated temperature control system 10' is activated by powering on wireless remote control module 1010 using user interface buttons 612, and by powering on wireless automated damper assembly 1012 using power button 1116. It should be noted that the food temperature probe 310 is optional throughout this example and does not necessarily affect the operation of the automated temperature control system 10'.

The user configures the cooking operation by interfacing with wireless remote control module 1010 in the same manner as described hereinabove for the first embodiment of the automated temperature control system 10. In the second embodiment, wireless remote control module 1010 serves only as an interface for the user, whereas the control circuitry of wireless local control module 1105 executes the primary control logic of FIG. 15. In the event of loss of communication between wireless automated damper assembly 1012 and wireless remote control module 1010, wireless automated damper assembly 1012 may continue controlling the temperature of the grill in accordance with the last received target temperature and stop criterion.

Upon initiation of a cooking cycle, the software installed in primary digital microcontroller 810 and secondary digital microcontroller 1410 operates in accordance with the continuous loops illustrated in FIGS. 15 and 16, respectively. With each cycle of the logic illustrated in FIG. 15, secondary digital microcontroller 1410 will send the current target temperature to and receive the current operating temperature and food temperature from primary digital microcontroller 810 by way of local wireless transceiver module 1312 and remote wireless transceiver module 1412. This wireless communication is initiated by signal exchanges between local wireless transceiver module 1312 and primary digital microcontroller 810, and signal exchanges between remote wireless transceiver module 1412 and secondary digital microcontroller 1410. Local wireless transceiver module 1312 and remote wireless transceiver module 1412 then exchange data through serial radio frequency transmissions.

In this manner, the current operating temperature and food temperatures (optional) are updated and displayed on visual display 614 with each software loop. Wireless automated damper assembly 1012 will control the grill operating temperature until the user either turns off the controller, or the specified cooking cycle completion criterion is met.

In alternative embodiments, control software of primary digital microcontroller 810 may be programmed to record system temperature response characteristics to data memory, such as onboard flash or EEPROM (electrically erased programmable read-only) memory. With such information, improved choices for the PID k-constants (or any tunable parameters associated with another suitable control scheme) may be calculated by the microcontroller for successive cooking operations. In this fashion, the controller of the automated temperature control system 10, 10' becomes increasingly effective at achieving the desired operating temperature while minimizing initial temperature rise time, temperature overshoot, and oscillatory startup response. With an appropriate adaptive control algorithm, the controller can effectively learn the response of the grill to valve plate 514 position changes and optimize the positioning function accordingly.

In another embodiment, a wireless configuration having two-way communications between a home computer, pocket computer, cell phone or the like and the local damper control module may be provided to allow additional flexibility in controller logic platforms and operation of the automated temperature control system 10'.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method of controlling a cooking temperature of a solid-fueled cooker, comprising:

a. sensing a first temperature within a cooking region of the solid-fueled cooker and generating a first sensed-temperature signal responsive thereto as a measure of said first temperature; and b. automatically controlling a motor-actuated vent valve so as to substantially regulate said first temperature within said cooking region of said solid-fueled cooker to a user-defined temperature level responsive to said first sensed-temperature signal, wherein said motor-actuated vent valve is in series with a vent port of said solid-fueled cooker so as to provide for substantially regulating said first temperature by controlling an exclusively-naturally-occurring flow of air into a combustion region of said solid-fueled cooker, and said motor-actuated vent valve incorporates an actuator motor external of said solid-fueled cooker, wherein said actuator motor provides for controlling a position of a valve of said motor-actuated vent valve to a continuum of positions within a range of said positions.

2. A method of controlling a cooking temperature of a solid-fueled cooker as recited in claim 1, wherein said motor-actuated vent valve comprises first and second valve plates, wherein said first and second valve plates are configured to relatively rotate about an axis of revolution with respect to one another with a relative rotational position responsive to a position of said actuator motor, and said first and second valve plates respectively comprise a plurality of first openings and a corresponding plurality of second openings, wherein:

a. in a first rotational position corresponding to a closed state of said motor-actuated vent valve, each first opening of said plurality of first openings in said first valve plate is blocked by said second valve plate, and each second opening of said plurality of second openings in said second valve plate is blocked by said first valve plate; and b. in a second rotational position corresponding to a fully-open state of said motor-actuated vent valve, each said first opening of said plurality of first openings in said first valve plate is aligned with a corresponding said second opening of said plurality of second openings in said second valve plate so as to provide for a maximum opening area through said first and second valve plates.

3. A method of controlling a cooking temperature of a solid-fueled cooker as recited in claim 2, wherein said actuator motor provides for rotationally positioning said first valve plate relative to said second valve plate within a continuum of relative rotational positions of said first valve plate relative to said second valve plate.

4. A method of controlling a cooking temperature of a solid-fueled cooker as recited in claim 3, wherein said actuator motor comprises a servo-motor operatively coupled to said first valve plate with a linkage so as to provide for the operation of substantially regulating said first temperature within said cooking region of said solid-fueled cooker.

5. A method of controlling a cooking temperature of a solid-fueled cooker as recited in claim 1, wherein the operation of automatically controlling said motor-actuated vent valve is performed by a controller that receives or generates said first sensed-temperature signal and determines a position to which said motor-actuated vent valve is controlled responsive to a sum of a difference between said first sensed-temperature signal and said user-defined temperature level, a time integral of said difference, and a time derivative of said difference, each multiplied by a corresponding associated factor.

6. A method of controlling a cooking temperature of a solid-fueled cooker as recited in claim 1, wherein said motor-actuated vent valve is operatively coupled to an exhaust vent of said solid-fueled cooker that receives combustion gases from said combustion region of said solid-fueled cooker so as to provide for the operation of substantially regulating said first temperature within said cooking region of said solid-fueled cooker.

7. A method of controlling a cooking temperature of a solid-fueled cooker as recited in claim 2, wherein said motor-actuated vent valve is operatively coupled to an exhaust vent of said solid-fueled cooker with a base adapter on top of and surrounding a chimney-vent portion of said solid-fueled cooker, said base adapter is operatively coupled to said second valve plate, and said exhaust vent of said solid-fueled cooker receives combustion gases from said combustion region of said solid-fueled cooker.

8. A method of controlling a cooking temperature of a solid-fueled cooker as recited in claim 6, wherein said motor-actuated vent valve is removably coupled to said exhaust vent of said solid-fueled cooker as an add-on to an existing said solid-fueled cooker.

9. A method of controlling a cooking temperature of a solid-fueled cooker as recited in claim 1, wherein said motor-actuated vent valve is operatively coupled to an inlet air vent of said solid-fueled cooker that supplies said air to said combustion region of said solid-fueled cooker.

10. A method of controlling a cooking temperature of a solid-fueled cooker as recited in claim 1, further comprising:

a. wirelessly communicating said user-defined temperature level from a second controller to a first controller operatively coupled to said motor-actuated vent valve, wherein said first controller provides for sensing said first temperature within said cooking region, and said first controller provides for controlling said motor-actuated vent valve responsive thereto; and b. wirelessly communicating said first sensed-temperature signal to said second controller for display thereupon.

11. A method of controlling a cooking temperature of a solid-fueled cooker as recited in claim 10, further comprising:

a. sensing a second temperature within a food item being cooked within said cooking region of said solid-fueled cooker and generating a second sensed-temperature signal responsive thereto as a measure of said second temperature, wherein said first controller provides for sensing said second temperature within said food item; and b. wirelessly communicating said second sensed-temperature signal to said second controller for display thereupon.

12. A method of controlling a cooking temperature of a solid-fueled cooker as recited in claim 1, where the operation of sensing said first temperature within said cooking region of said solid-fueled cooker is at a location external of a food item being cooked within said cooking region of said solid-fueled cooker.

13. A method of controlling a cooking temperature of a solid-fueled cooker as recited in claim 1, wherein the operation of automatically controlling said motor-actuated vent valve is under power of a battery.

14. A method of controlling a cooking temperature of a solid-fueled cooker as recited in claim 1, wherein said actuator motor of said motor-actuated vent valve is external of said valve of said motor-actuated vent valve, relative to said solid-fueled cooker.

15. A method of controlling a cooking temperature of a solid-fueled cooker as recited in claim 1, wherein said solid-fueled cooker is partitioned into said combustion region and said cooking region, and combustion gases generated from a combustion of solid fuel in said combustion region are exhausted directly from said combustion region.

16. A method of controlling a cooking temperature of a solid-fueled cooker as recited in claim 10, wherein said second controller is a device selected from the group consisting of a cell phone, a home computer, and a pocket computer.

* * * * *